(12) United States Patent
Collomosse

(10) Patent No.: US 11,704,559 B2
(45) Date of Patent: Jul. 18, 2023

(54) LEARNING TO SEARCH USER EXPERIENCE DESIGNS BASED ON STRUCTURAL SIMILARITY

(71) Applicant: Adobe Inc., San Jose, CA (US)

(72) Inventor: John Collomosse, San Jose, CA (US)

(73) Assignee: Adobe Inc., San Jose, CA (US)

( * ) Notice: Subject to any disclaimer, the term of this patent is extended or adjusted under 35 U.S.C. 154(b) by 432 days.

(21) Appl. No.: 16/904,460

(22) Filed: Jun. 17, 2020

(65) Prior Publication Data
US 2021/0397942 A1 Dec. 23, 2021

(51) Int. Cl.
| | | |
|---|---|---|
| *G06N 3/08* | (2023.01) | |
| *G06N 3/04* | (2023.01) | |
| *G06F 18/2135* | (2023.01) | |
| *G06N 3/045* | (2023.01) | |
| *G06F 8/38* | (2018.01) | |
| *G06F 16/583* | (2019.01) | |

(52) U.S. Cl.
CPC ............ *G06N 3/08* (2013.01); *G06F 8/38* (2013.01); *G06F 16/583* (2019.01); *G06F 18/21355* (2023.01); *G06N 3/04* (2013.01); *G06N 3/045* (2023.01)

(58) Field of Classification Search
CPC .......... G06N 3/04; G06N 3/08; G06K 9/6248; G06V 10/7715; G06V 30/19127; G06F 16/583; G06F 16/5846; G06F 16/5854; G06F 16/90; G06F 16/903; G06F 16/906; G06F 16/907; G06F 16/908; G06F 16/90328; G06F 16/9035; G06F 16/953

USPC ..................... 717/15, 16, 18, 20, 21
See application file for complete search history.

(56) References Cited

U.S. PATENT DOCUMENTS

| | | | |
|---|---|---|---|
| 9,799,131 B1* | 10/2017 | Demiralp | ............... G06F 16/958 |
| 2011/0099498 A1* | 4/2011 | Barkol | .................... G06F 9/451 |
| | | | 715/771 |
| 2011/0107243 A1* | 5/2011 | Jain | .......................... G06F 8/36 |
| | | | 707/769 |

(Continued)

OTHER PUBLICATIONS

Huang, Forrest, et al., Swire: Sketch-based User Interface Retrieval, CHI '19: Proceedings of the 2019 CHI Conference on Human Factors in Computing Systems, May 2019, pp. 1-10, [retrieved on Sep. 14, 2022], Retrieved from the Internet: <URL:http://dl.acm.org/>.*

(Continued)

*Primary Examiner* — Geoffrey R St Leger
(74) *Attorney, Agent, or Firm* — Nicholson De Vos Webster & Elliott LLP

(57) ABSTRACT

Embodiments are disclosed for learning structural similarity of user experience (UX) designs using machine learning. In particular, in one or more embodiments, the disclosed systems and methods comprise generating a representation of a layout of a graphical user interface (GUI), the layout including a plurality of control components, each control component including a control type, geometric features, and relationship features to at least one other control component, generating a search embedding for the representation of the layout using a neural network, and querying a repository of layouts in embedding space using the search embedding to obtain a plurality of layouts based on similarity to the layout of the GUI in the embedding space.

16 Claims, 14 Drawing Sheets

(56) References Cited

U.S. PATENT DOCUMENTS

2021/0271494 A1* 9/2021 Rosenbaum ........... G06N 20/00

OTHER PUBLICATIONS

Chen, Chunyang, et al., Gallery D.C.: Design Search and Knowledge Discovery through Auto-created GUI Component Gallery, Proceedings of the ACM on Human-Computer Interaction, Nov. 2019, pp. 1-22, [retrieved on Sep. 13, 2022], Retrieved from the Internet: <URL:http://dl.acm.org/>.*

Deka et al., Rico: A Mobile App Dataset for Building Data-Driven Design Applications, in Proceedings of the 30th Annual Symposium on User Interface Software and Technology, 2017, 10 pages.

* cited by examiner

LEARNING TO SEARCH USER EXPERIENCE DESIGNS BASED ON STRUCTURAL SIMILARITY

BACKGROUND

Recent years have seen a rapid proliferation in the use of web-based and app-based services. This increase has brought with it a greater emphasis on the importance of user experience (UX) design. UX may include the user's perceptions of the ease of use, utility, and general usability of the interface, as well as the user's emotions and feelings while using the interface. One part of UX design is layout, where arrangements of user interface components form the blueprints for interactive applications. Given the importance of UX to the success of a given application, developers, companies, and dedicated design firms invest significant time and resources into UX development.

Access to past UX designs can be useful in designing new UX designs. For example, past UX layouts that have been successful may influence how new user interfaces are designed. However, searching through past UX designs is not straightforward. In the past, images of user interfaces may be compared to identify user interfaces that appear visually similar (e.g., similar color schemes, size, and shape of objects in the user interfaces, etc.). But images of user interfaces provide limited information about how the user interface actually works (e.g., what are the components of the user interface, how does the user interact with the user interface, etc.). As such, two user interfaces that look similar may actually provide very different user experiences, while user interfaces that do not look similar may provide similar user experiences. As a result, it is difficult to effectively search through existing user interfaces for similar designs, which generally results in new user interfaces being designed from the ground up rather than leveraging features of previously designed user interfaces.

These and other problems exist with regard to designing user interfaces and user experiences in electronic systems.

SUMMARY

Introduced here are techniques/technologies that use machine learning techniques to encode user experience layouts into search embeddings and use the search embeddings to identify layouts that are structurally similar to one another. In particular, in one or more embodiments, the disclosed systems and methods may include generating a representation of a layout of a graphical user interface (GUI). The layout including a plurality of control components, each control component including a component class, geometric features, and relationship features to at least one other control component. A search embedding may be generated for the representation of the layout using a neural network. A repository of layouts may be queried in embedding space using the search embedding to obtain a plurality of layouts based on similarity to the layout of the GUI in the embedding space More specifically, in one or more embodiments, the systems and methods generate a graph representation of a UX layout. The graph representation may include nodes and edges, where each node corresponds to a different component of the user interface (e.g., buttons, icons, sliders, text, images, etc.) and each edge corresponds to how a given pair of nodes are related to one another (e.g., relative distance, aspect ratio, orientation, nesting, etc.). This encodes the structure of the layout and not merely the look and feel of the layout into a graph representation. This graph representation can then be processed by a layout encoder, such as a graph convolutional network (GCN) to generate a search embedding for the layout.

In some embodiments, the layout encoder may be trained as part of a hybrid layout encoder-layout decoder architecture, where the layout encoder (e.g., a GCN) encodes an input layout into a search embedding, and the layout decoder (e.g., a convolutional neural network) decodes the search embedding into a raster representation. The raster representation may have a number of channels equal to the number of different classes of components of a UX layout that the layout encoder is configured to encode. The resulting raster representation can be compared to a ground truth raster representation of the input layout and the GCN-CNN network can be trained based on the difference between the raster representations. Once trained, the layout encoder can be used independently of the layout decoder to encode layouts into search embeddings. Similar layouts may be identified by determining a distance between their search embeddings in the embedding space.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a layout management system that uses machine learning to learn structural similarities between UX layouts which can be used to more accurately identify similar UX layouts. Layout is fundamental to UX design, where arrangements of user interface components form the blueprints for interactive applications. Repositories of UX layouts are openly shared online in creative portfolio websites, e.g. Behance.net, etc., embodying the best practices and creativity of thousands of UX design professionals. The ability to easily search these repositories offers an opportunity to discover and re-use layouts, democratizing access to this wealth of design expertise. Searching repositories of past UX designs is also useful for individual creatives or design houses to recall similar prior work both for efficiency and/or for consistency of style.

Search for UX design is challenging, as layouts typically exhibit complex geometry and even nesting of interface components. These properties are lost in traditional search techniques which rely on visual search technologies. Such raster based typically inaccurate at recalling detail in the design, do not explicitly encode common UX design properties (such as component nesting), and so result in poorer accuracy at matching UX designs. Embodiments discussed herein generate a layout representation that encodes these structural properties. The layout representation may then be input to a neural network which maps the layout representation to a search embedding. This search embedding can then be compared to the search embeddings generated for other layouts to identify layouts that are structurally similar.

Figure 1:
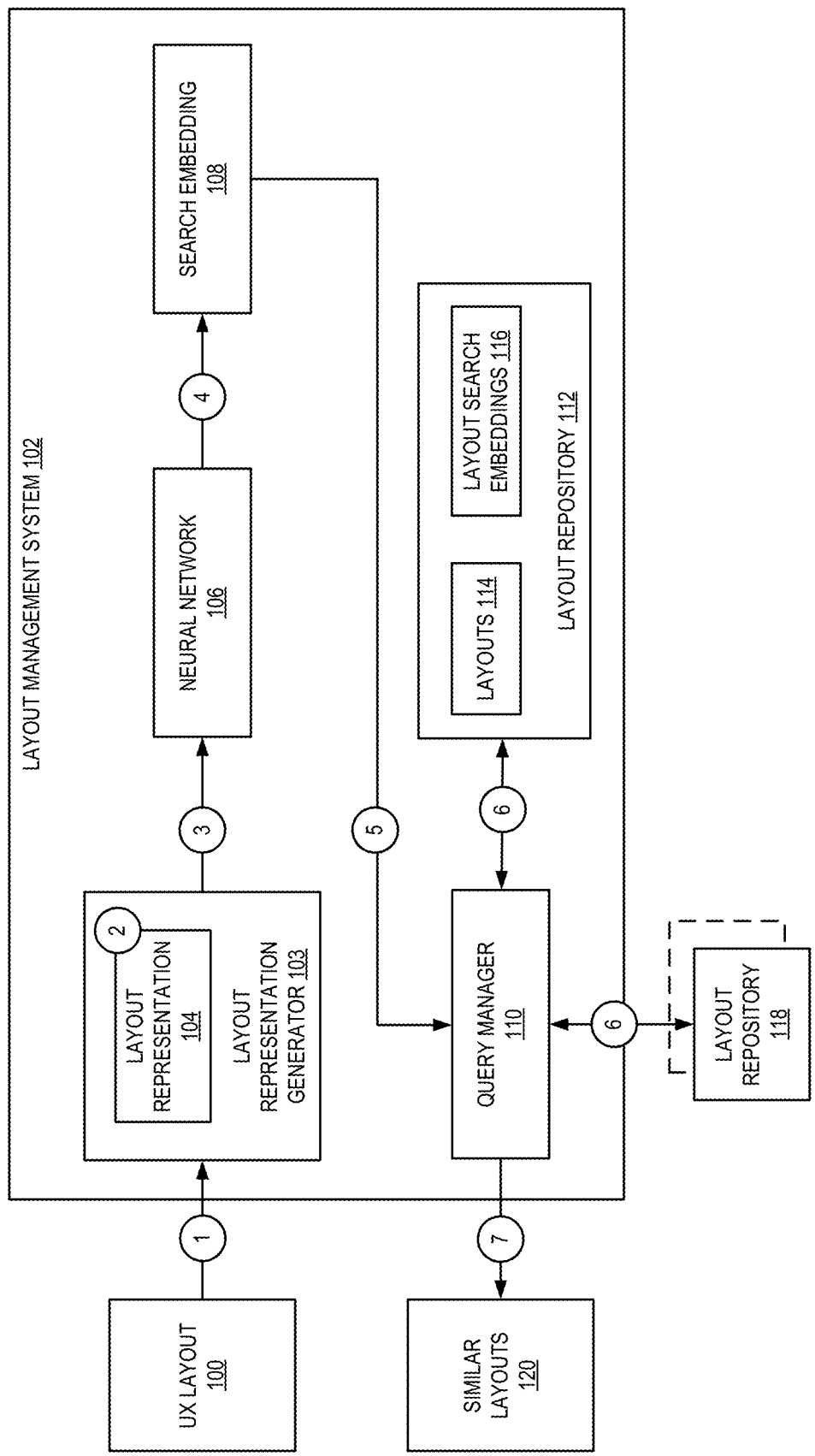
FIG. 1 illustrates a diagram of a process of generating a search embedding for a user interface layout in accordance with one or more embodiments.

FIG. 1 illustrates a diagram of a process of generating a search embedding for a user interface layout in accordance with one or more embodiments. As discussed, typical UX layout searching is done using visual techniques which search for images of layouts. Although two layouts may appear similar visually, the actual components of the interfaces which the user interacts with may be different. Images of UX layouts fail to capture sufficient detail of the layouts to accurately identify similar layouts. As shown in FIG. 1, in one or more embodiments, a UX layout 100 can be received by a layout management system 102, as shown at numeral 1. For example, a layout includes an arrangement of user interface control components of an application (e.g., "app"), website, or other user interface. For example, a UX layout may comprise a GUI or other user interface. A user interface component, (also referred to as a control component or component) may include various elements that commonly appear in user interfaces which may each have an associated class, such as text buttons, icons, sliders, radio buttons, images, text, etc.

The UX layout 100 can be a labeled or annotated image of all or a portion of a UX layout. For example, an image of a UX layout may be labeled or annotated with bounding boxes around each component represented in the image and each bounding box may be associated with a class label or annotation that identifies the type of component (e.g., text button, icon, slider, etc.). In some embodiments, as discussed further below, the input UX layout may be automatically annotated by passing the UX layout 100 through a trained layout detector. The layout detector may be a machine learning model trained to identify UX components in an image and which outputs bounding box and class labels or annotations for each identified UX component. In some embodiments, the UX layout can be obtained from a UX design tool which enables users to design user interfaces. The UX layout from the design tool may include dimensions, a class, and a location of each component in the user interface.

As shown in FIG. 1, the layout management system 102 can include a layout representation generator 103 that transforms the UX layout 100 into a layout representation 104, as shown at numeral 2. For example, the UX layout can be represented as a spatial graph, where each node of the graph corresponds to a different component and each edge represents the relationships between components. By encoding the geometric features and relationship features of the components of the UX layout 100, the graph representation provides more details about the UX layout than a mere image. Each node of the graph, corresponding to a different component of the UX layout 100, can include a semantic property and a geometric property of the component. The semantic property may define the class to which the component belongs. In some embodiments, this may be represented by a one-hot vector which denotes the component class. For example, a one-hot vector may be of a length equal to the number of different classes of UX components the layout management system is configured to recognize. Since a given component can only belong to one class of UX components, the value of the entry of the one-hot vector corresponding to the component's class may be, for example, "1," while all other entries may be, in this example, "0". Each node may additionally include geometric features for the corresponding UX component. The geometric features may include the spatial location of the component in the UX. For example, the geometric features of a component $c_i$, may include the height and width of the component and the centroid of the component.

The nodes of the layout representation 104 may be connected by edges, where each edge includes relationship features between the components corresponding to the connected nodes. For example, the relationship features can include a relative distance between the components, aspect ratios, orientation, and whether one component is nested within another component. In some embodiments, the spatial graph layout representation may be a directed graph, as such there are two edges connecting each pair of nodes. By encoding geometric and relationship features into the graph, fine-grain arrangements of components can be retrieved which would be lost in raster representations.

With the UX layout 100 encoded into layout representation 104, at numeral 3 the layout representation can be input to a neural network 106. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the layout management system are discussed below with respect to FIGS. 5 and 8.

In some embodiments, where the layout representation 104 is a graph, the neural network 106 may be a graph convolutional network (GCN). GCNs are specialized convolutional neural networks (CNN) designed to analyze non-Euclidean data for deep learning, e. g., social graphs, communication, traffic networks, etc. As discussed further below with respect to FIGS. 7-9, the neural network 106 can be trained as a hybrid GCN-CNN, where the GCN encodes the input training layouts into a high dimensional latent representation, referred to herein as search embedding and, during training, the CNN decodes the search embedding into a raster representation of the input UX layout 100. This raster representation may include a number of channels equal to the number of classes of UI components. The neural network can be trained end-to-end based on a reconstruction loss function between the output raster representation of the search embedding and a ground truth raster representation of the training input layout. This training may be performed using a training data set of labeled UX layouts over a number of epochs until the loss function stabilizes and/or reaches a threshold value indicating that the neural network is trained.

Once the neural network 106 has been trained it can be used by layout management system 102 to search for layouts in a layout repository similar to an arbitrary input UX layout 100. As discussed, the arbitrary input layout 100 can be transformed into a layout representation 104 which is input to the trained neural network 106. As shown at numeral 4, the neural network encodes the input layout into a search embedding 108. This search embedding 108 can then be compared to search embeddings for layouts in a layout repository in the embedding space to identify similar layouts. For example, as shown at numeral 5, the layout management system 102 may include a query manager 110 which receives the search embedding 108 generated for UX layout 100. The query manager can use the search embedding 108 to search layouts 114 stored in layout repository 112 that are structurally similar 114 to UX layout 100. The query manager can compare the search embedding 108 to search embeddings 116 that have been generated for the layouts 114. For example, a distance metric, such as L1 or L2 distance metrics, may be used to identify layouts from the layout repository that are "close" to the input layout in the high-dimensional embedding space. In some embodiments, the layout repository or repositories being search may include layout repository 112 maintained by layout management system 102 and/or may include external layout repository or repositories 118 (e.g., accessible over one or more networks, such as the Internet). The layout repository may include publicly available UX layouts, such as those in the Rico Dataset (such as described in Rico: A Mobile App Dataset for Building Data-Driven Design Applications, in Proceedings of the 30th Annual Symposium on User Interface Software and Technology (UIST '17)), and/or may include a privately curated layout repository maintained by a user, UX design company, or other entity.

At numeral 7, the layout management system 102 can return a set of structurally similar layouts 120 that are close to the input layout in the high-dimensional embedding space. This may be a ranked list of layouts from the repository, ranked in descending or ascending order of "closeness" in the embedding space and/or may include those layouts which are within a threshold distance of the input layout in the embedding space. In some embodiments, the layouts identified by the layout management system may be used by a UX design tool, such as ADOBE® XD which is either a registered trademark or trademark of Adobe Inc. in the United States and/or other countries, to provide a layout recommendation based on similar layouts. For example, locations of components to add to the UX layout during design, or changes in location, size, etc. of existing components in a UX layout may be recommended based on similar layouts identified in the layout repository. In some embodiments, the layout recommendation may be to indicate similarities to layouts that have been labeled with negative feedback, indicating that the current layout may also be received negatively. In some embodiments, recommendations may be generated as a layout is designed in the UX design tool.

Such recommendations are possible because of the learned semantic, geometric, and relationship features that were used to train the neural network 106. This level of detail is lost in traditional raster-based search techniques. As such, embodiments enable a designer to leverage the creative knowledge embodied in existing layout designs when designing a new UX layout, enhancing the productivity of the designer. This is useful for both novice designers and experienced designers working in a new field. Additionally, such layout comparisons can be used by a design firm, company, or other entity to ensure that their UX layouts across different products and/or platforms provide a coherent, consistent user experience and that new UX layouts can be developed more quickly than under previous systems.

Figure 2:
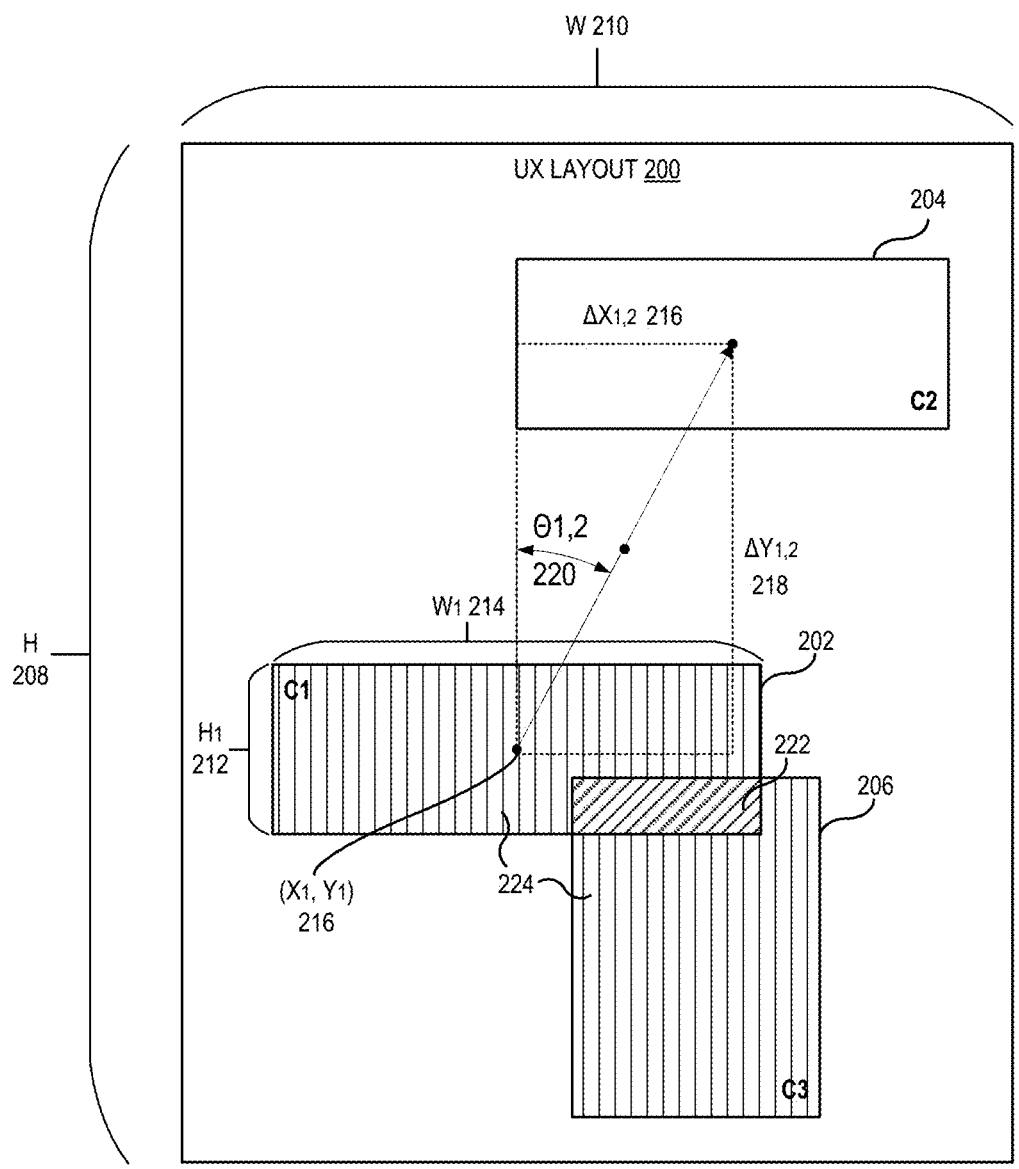
FIG. 2 illustrates a diagram of an example user interface layout in accordance with one or more embodiments.

FIG. 2 illustrates a diagram of an example user interface layout in accordance with one or more embodiments. In the example layout of FIG. 2, UX layout 200 includes three components: c1 202, c2 204, and c3 206. These components may each belong to a class of UI components, as discussed, such as text input, image, icon, etc. The UX layout may be of height H 208 and width W 210. The geometric, semantic, and relationship features of the UX layout need to be determined to be encoded into a layout representation.

As discussed, the UX layout 200 can be represented as spatial graph $\mathcal{G} =(v,\varepsilon)$ where $v=\{c_1, \ldots, c_i, \ldots, c_\kappa\}$ is a set of nodes representing its κ UI components, and $\varepsilon=\{e_{11}, \ldots, e_{ij}, \ldots e_{\kappa\kappa}\}$ is the set of edges that denote the existence of a relationship between the nodes. As discussed, each node may include two types of information: semantic features and geometric features. The semantic feature of a given node may define the class of component to which that node's corresponding component belongs. This may be encoded as a one-hot vector where the entry corresponding to that component's class is "1" and all other entries are "0". The geometric features may include the spatial location of the component in the UI. For example, the geometric features of a component $c_i$, may be represented as $$g_i = \left[\frac{x_i}{W}, \frac{y_i}{H}, \frac{w_i}{W}, \frac{h_i}{H}, \frac{A_i}{WH}\right],$$

where $(x_i, y_j)$ represents the centroid of the component, $(w_i, h_i)$ represents the width and height of the component, and $A_i=\sqrt{w_i h_i}$. For example, as shown in FIG. 2, component $c_1$ has height $h_1$ 212, width $w_1$ 214, and centroid located at 216, as a result the geometric features of component $c_1$ are $$g_1 = \left[\frac{x_1}{W}, \frac{y_1}{H}, \frac{w_1}{W}, \frac{h_1}{H}, \frac{A_1}{WH}\right].$$

In some embodiments, the W and H may be standardized (e.g., all layouts are scaled to the same size). For example, the H and W may be set to 256 and 128, respectively.

As discussed, the edges of the graph that connect pairs of nodes include the relationship features. These relationship features may include the distance between two components, the angle between two components, nesting relationships, etc. For example, the relationships between a given pair of components can be represented as $$r_{i,j} = \left[\varphi_{i,j}, \theta_{i,j}, \frac{\Delta x}{A_i}, \frac{\Delta y}{A_i}, \frac{w_j}{w_i}, \frac{h_j}{h_i}, \frac{1}{D}\sqrt{\Delta x^2 + \Delta y^2}\right],$$

where $\Delta x = x_j - x_i$ and $\Delta y = y_j - y_i$ are the x and y shifts between components and constant $D = \sqrt{w^2 + h^2}$ which normalizes along the diagonal between the two components. As shown in FIG. 2, the difference between the centroids of c1 202 and c2 204 are depicted at $\Delta x_{1,2}$ 216 and $\Delta y_{1,2}$ 218.

In addition, the feature $r_{i,j}$ incorporates various geometric relations such as orientation $$\theta_{i,j} = a\tan 2\left(\frac{\Delta x}{\Delta y}\right).$$

For example, the angular difference between c1 and c2 is depicted at $\theta_{1,2}$ 220. Additionally, the relationship features include a containment feature $\varphi_{i,j}$ which represents the Intersection over Union (IoU) between components. This captures any nesting of one component in another. The containment feature $\varphi_{i,j}$ of two components can be represented as $$\varphi_{i,j} = \frac{M(c_i) \cap M(c_j)}{M(c_i) \cup M(c_j)},$$

where $M(\cdot)$ indicates the mask of a component. In various embodiments, the containment feature $\varphi_{i,j}$ can be computed based on the bounding boxes of the overlapping components without requiring rasterization. For example, as shown in FIG. 2, component c1 202 overlaps with component c3. As such, the containment feature $\varphi_{1,3}$ is the intersection of the masks 222 (e.g., the overlapping portion of the two masks) divided by the union of the masks 224 (e.g., the combined area of the masks of c1 202 and c3 206.

In some embodiments, the spatial graph can be an undirected graph, where each pair of nodes are connected by a single undirected edge, or a directed graph, where each pair of nodes is connected by two directed edges. For example, in the undirected graph representation, a single edge, $E = \{e_{i,j}\}$ for $\forall i,j = 1, 2, \ldots, k$ such that, $j \geq i$, may be created between two components $c_i$ and $c_j$. In the directed graph example, two directed edges are created between each pair of components $c_i$ and $c_j$ (e.g., nodes $n_1$ and $n_2$ are connected by edges $r_{1,2}$ and $r_{2,1}$). In the directed graph example, the geometric relationships between a given pair of nodes may not be identical in the directed edges (e.g., $r_{1,2} \neq r_{2,1}$).

Figure 3:
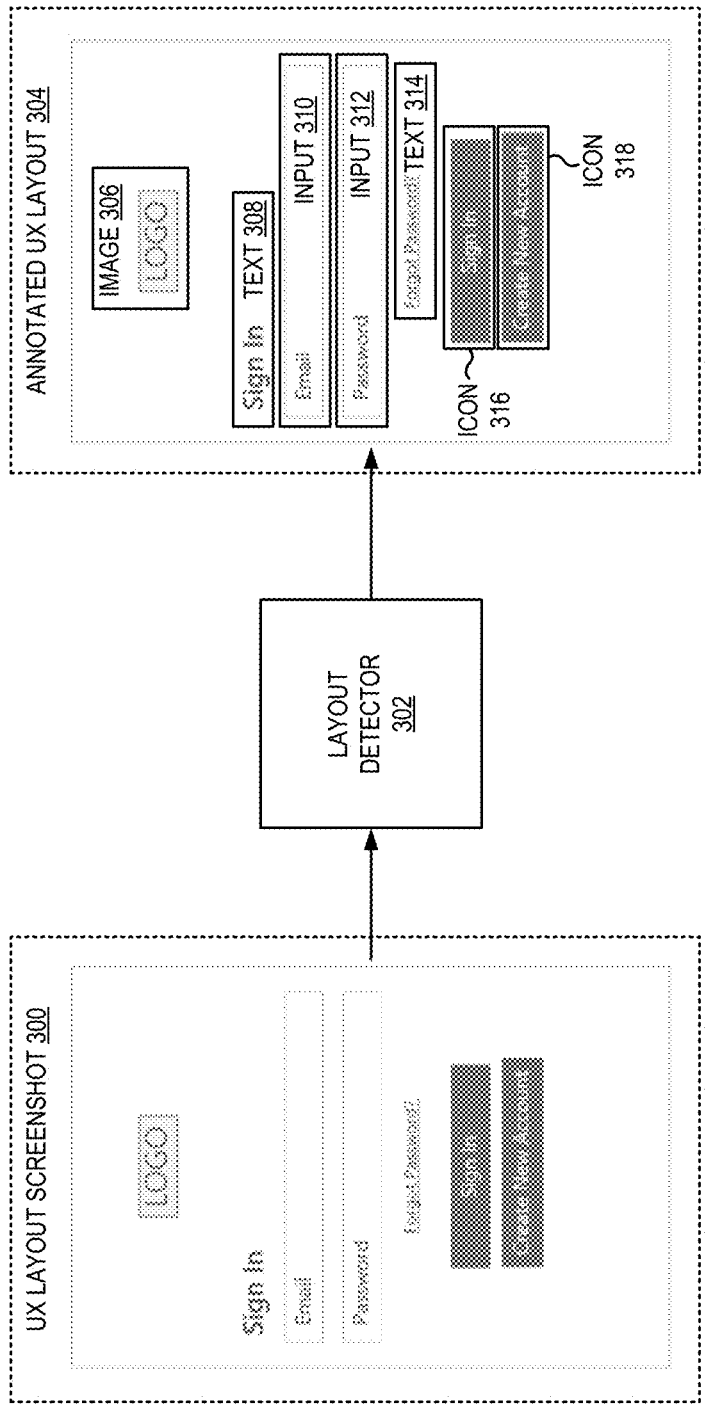
FIG. 3 illustrates a diagram of a process of generating a user interface layout using a detector in accordance with one or more embodiments.

FIG. 3 illustrates a diagram of a process of generating a user interface layout using a detector in accordance with one or more embodiments. As discussed above, the geometric and relationship features to be encoded into a layout representation may be based on bounding boxes or masks of the components of the UX. If the UX is being developed using a UX design tool, the mask dimensions, spatial positions, and UX size may be obtained directly from the UX design tool. However, if only a screenshot or other image of the UX is available, this data may not be readily available. As such, in some embodiments, a layout detector model may be used to automatically obtain an annotated UX image that includes bounding boxes which may be used to determine the geometric and relationship features to be encoded into the layout representation.

As shown in FIG. 3, a screenshot 300 of a UX layout may be obtained. The screenshot does not have any additional details as to the components of the UX, their locations, their component classes, etc. Before the layout can be input to the neural network, the screenshot needs to be labeled or annotated with this information. In some embodiments, a layout detector 302 may be used to automatically annotate the screenshot 300 with some or all of this data. Layout detector 302 may be a neural network trained for objection detection, such as a region-based convolutional neural network (R-CNN), a Fast R-CNN, a Faster R-CNN, or other object detection model.

The output of the layout detector 302 can be an annotated UX layout 304, in which bounding boxes and component classes have been added to each identified component of the UX layout screenshot 300. For example, a bounding box and class IMAGE 306 have been added to the logo at the top of the screenshot. Additionally, a bounding box and class TEXT 308 have been added to the Sign In portion of the screen shot, as well as bounding boxes and class INPUT 310, 312 to the email and password input boxes. Similarly, the link to Forgot Password? has had a bounding box and class TEXT 314 added. Finally, bounding boxes and class ICON 316, 318 have been added to the "Sign In" and "Create New Account" buttons. The class annotations can be used to add the semantic features to the nodes corresponding to these components. Additionally, the bounding box coordinates can be used to compute centroids, heights, and widths of each component and this information can be used to determine the geometric features and relationship features between each pair of components, as described above.

Figure 4:
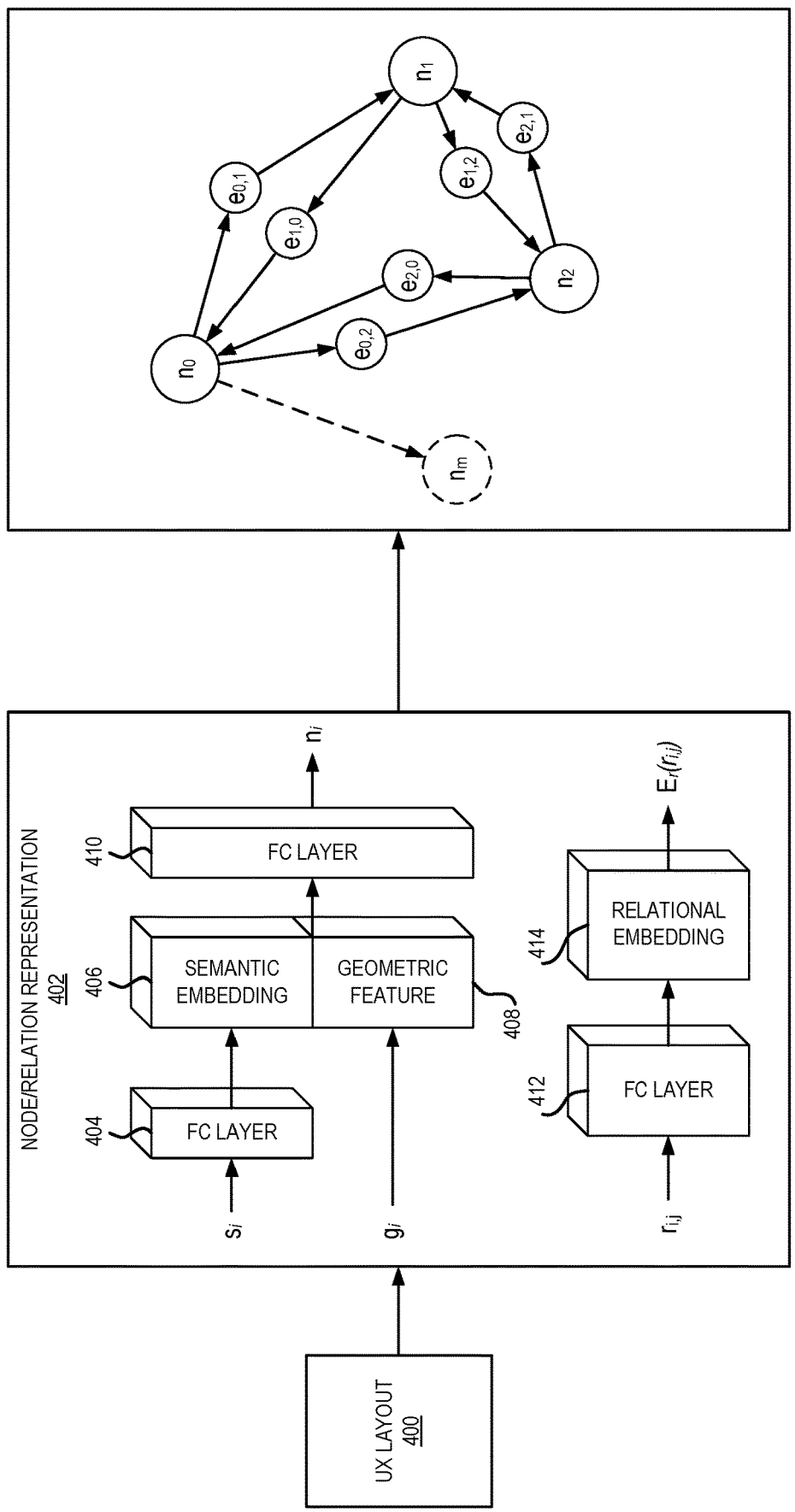
FIG. 4 illustrates a diagram of generating a graph representation of a user interface layout in accordance with one or more embodiments.

FIG. 4 illustrates a diagram of generating a graph representation of a user interface layout in accordance with one or more embodiments. As described above, a given UX layout 400 can be encoded into a layout representation using the semantic, geometric, and relationship features of the components of the UX. As discussed, the layout management system can include a neural network that encodes a layout into a search embedding. The layout encoder can include two parts: a first part which encodes the layout into a layout representation, and a GCN which encodes the layout representation into a search embedding. The example of FIG. 4 illustrates the encoding of a UX layout 400 into a graph representation 416 of the UX layout.

As discussed above with respect to FIG. 2, the nodes and edges of a graph representation of a layout can encode the semantic, geometric, and relationship features of the UX layout. As shown in FIG. 4, the semantic, $s_i$, geometric, $g_i$, and relationship, $r_{i,j}$, features can be passed through fully connected layers to obtain the node and relationship features that are encoded into a graph representation of the layout. For example, as shown in node/relation representation block 402, the semantic feature of a component of UX layout 400 is passed through a fully connected layer 404 to obtain a semantic embedding 406. In some embodiments, the semantic feature is encoded into $N_s$ trainable semantic embeddings, where $N_s$ corresponds to the number of semantic classes of user interface (UI) components. The semantic embedding can be concatenated with the geometric features 408, as described above with respect to FIG. 2, for that component, and the result can be passed through another fully connected layer 410 to obtain node features for that component. This can be repeated for each component in UX layout 400. As a result, node features, $n_i$, can be represented as $n_i=E_n([E_s(s_i)g_i])$, where $E_s$ is the embedding layer that learns the UI class embeddings (e.g., the semantic embeddings), and $E_n$ is a linear layer that projects the semantic and geometric features into node feature $n_i$. Similarly, the relationship features can be passed through a fully connected layer 412 to obtain a relationship embedding 414. For example, the edge features $r_{ij}$ are projected by $E_r(r_{ij})$.

Graph representation 416 can include the node and relationship features determined in the node/relation representation 402. For example, each node represents node features $n_0, n_1, n_2, \ldots, n_m$. As described above, this includes the geometric and semantic features of the components of the UX layout 400. The relationship features $r_{ij}$ can be added to edge nodes that are included in each edge (e.g., edge nodes $e_{ij}$, as shown in graph representation 416). The resulting graph representation 416 can be input to a GCN to map the graph representation to a search embedding, as discussed further below with respect to FIG. 5.

Figure 5:
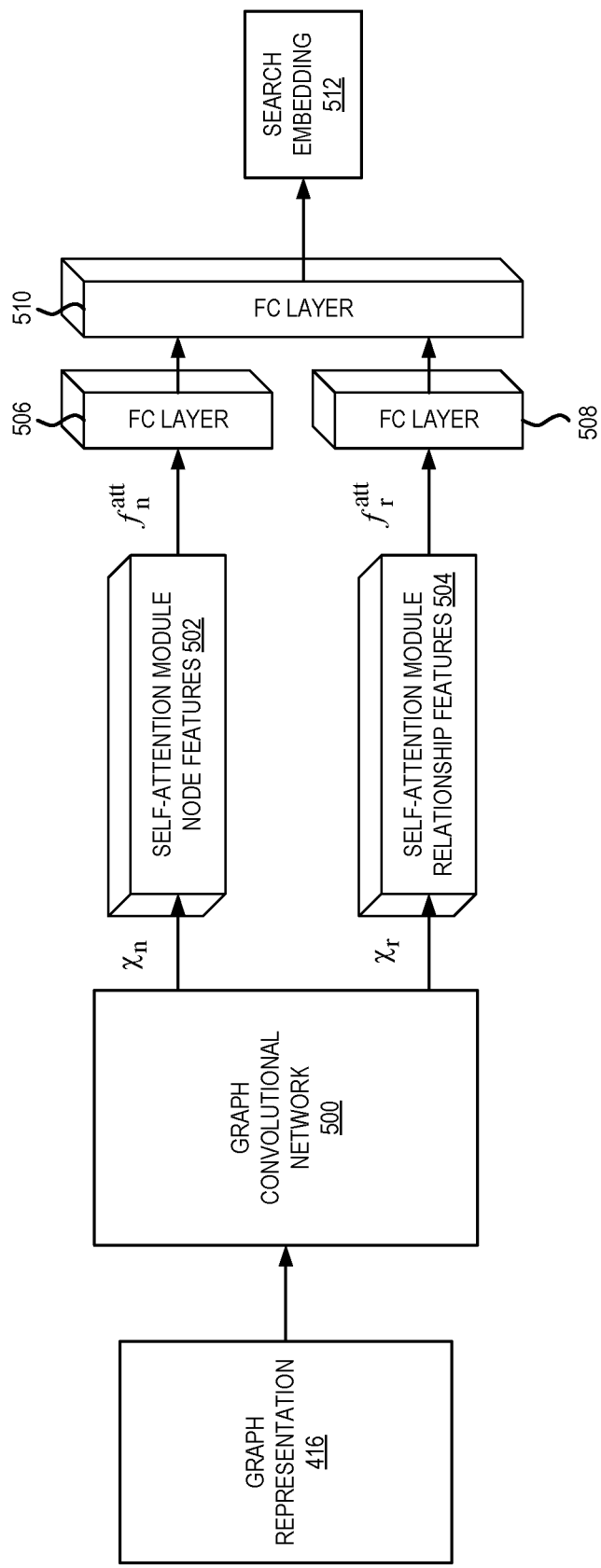
FIG. 5 illustrates an example of a layout encoder using a graph convolutional network, in accordance with an embodiment.

FIG. 5 illustrates an example of a layout encoder using a graph convolutional network, in accordance with an embodiment. As shown in FIG. 5, the graph representation 416 created in FIG. 4 can be input to a graph convolutional network (GCN) 500. As discussed, a GCN may be a neural network that operates on a graph. In some embodiments, the node features and the edge features may be operated on by the GCN 500 to identify features of the graph. The GCN 500 may include multiple layers, including one or more layers for processing node features and one or more layers for processing relationship features. For example, the node features generated by the GCN may be represented as $x_{n_i}=g_n(n_i)$, where $x_{ni}$ represents the node features generated for node $n_i$ which represents each node from graph representation 416, and $g_n()$ represents the layers of GCN that process the node features. Similarly, the relationship features generated by the GCN may be represented as $x_{r_{ij}}=g_r([n_i E_r(r_{ij})n_j])$, where $x_{rij}$ represents the relationship features generated for tuples $n_i E_r(r_{ij})n_j$ (e.g., node-relationship-node) which represents the edge features connecting node $n_i$ with node $n_j$ from graph representation 416, and $g_r()$ represents the layers of GCN that process the relationship features.

GCN 500 does not natively output a single embedding, it instead outputs a set of embeddings for both the node features and the relationship features. For example, the set of node embeddings output by the GCN may be represented as $\chi_n=\{x_{n_1}, n_2, \ldots, n_k\}$ and the set of relationship embeddings can be expressed as $\chi_r=\{x_{n_{11}, n_{12}, \ldots, n_{k'}}\}$, where $\kappa$ and $\kappa'$ are the number of components (e.g., node features) and the total number of the relationship features which vary depending on the UI layout. As shown in FIG. 5, $\chi_n$ and $\chi_r$ can each be output to a self-attention module, with $\chi_n$ being output to self-attention module for node features 502 and $\chi_r$ being output to self-attention module for relationship features 504. Each self-attention module may output a weighted average of the node features and the relationship features, respectively. In some embodiments, the node features and relationship features can each be averaged (e.g., where no weight, or effectively a weight of 1 is used for each of the node and relationship embeddings). Alternatively, the weights may be based on each component's area in the layout. As a further alternative, the weights used by each self-attention module may be learned via learnable pooling.

In learnable pooling, a weighted average node feature, $f_n^{att}$, and a weighted average relationship feature, $f_r^{att}$, can each be determined using learned weights. These weights may be learned as part of the end-to-end training of the GCN, as discussed further below. In some embodiments, the weighted average node feature is $f_n^{att}=\Sigma_{i=1}^{\kappa}\alpha_{n_i}x_{n_i}$, and the weighted average relationship feature is $f_r^{att}=\Sigma_{i=1}^{\kappa'}\alpha_{r_i}x_{r_i}$, where $\alpha_{n_i}$ and $\alpha_{r_i}$ are the node and relationship attention weights, respectively. The attention weights may be determined based on the following equations $$\alpha_{n_i} = \frac{\exp(w_n^T x_{n_i})}{\Sigma_{l=1}^{K}\exp(w_n^T x_{n_l})} \text{ and } \alpha_{r_i} = \frac{\exp(w_r^T x_{r_i})}{\Sigma_{l=1}^{K'}\exp(w_r^T x_{r_l})}$$

The weighted average node feature is output to a fully connected layer 506 and the weighted average relationship feature is output to a fully connected layer 508. The outputs of these fully connected layers are then passed to a fully connected layer 510 which outputs the search embedding 512 for the input layout. The search embedding 512 can be a d-dimensional embedding that encodes the input UI layout. This search embedding can be compared with the search embeddings from other layouts to identify similar layouts.

Figure 6:
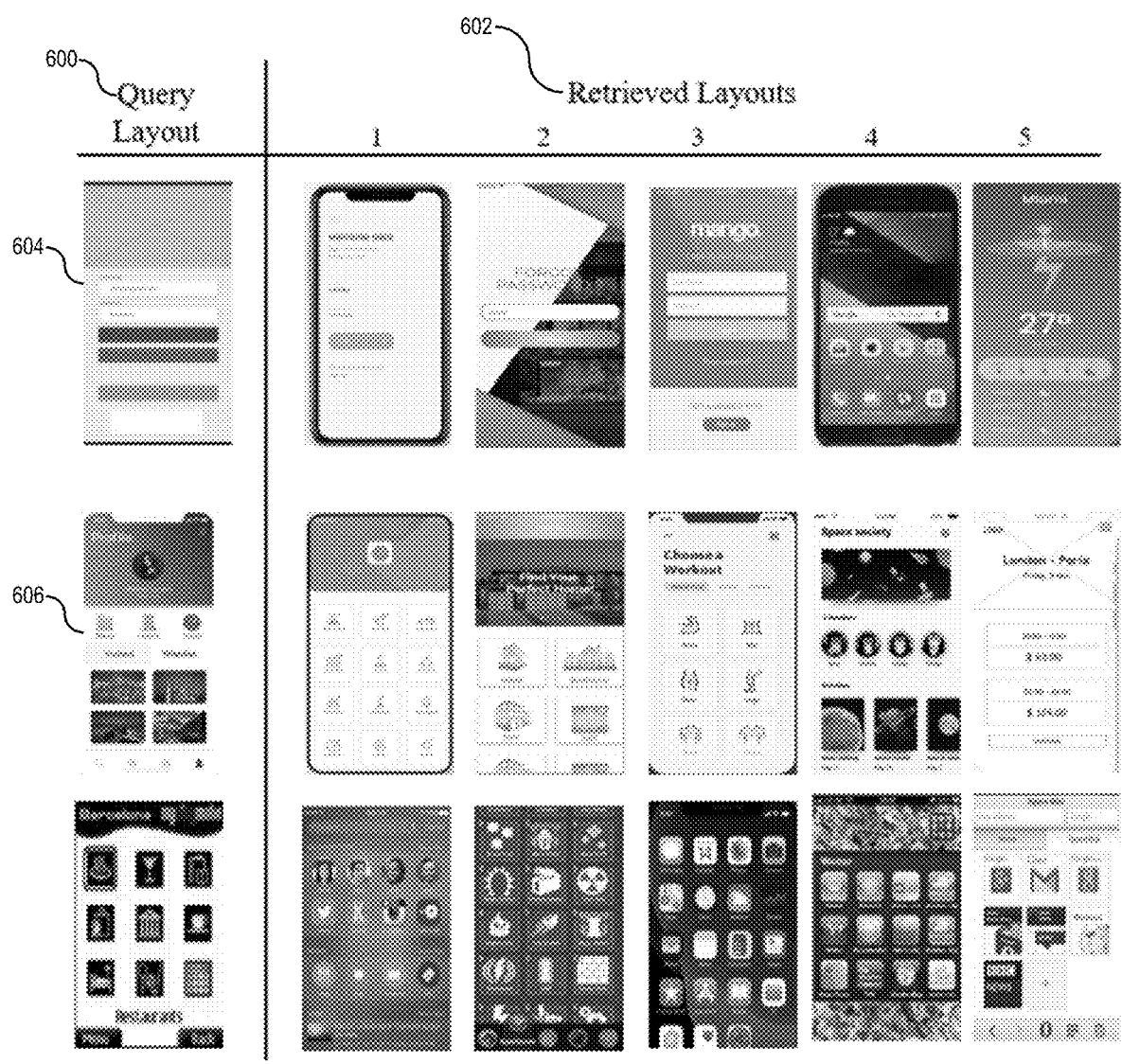
FIG. 6 illustrates an example of a layout query and query results in accordance with one or more embodiments.

FIG. 6 illustrates an example of a layout query and query results in accordance with one or more embodiments. As shown in FIG. 6, a query layout 600 can be provided to the layout management system to identify similar layouts from a layout repository. As discussed, the query layout may be provided from a UX layout design tool, which may include component dimensions, class types, spatial locations, etc. in a format that the layout management system may use to generate a layout representation. Alternatively, the query layout 600 may be provided as an image file (e.g., as a screenshot of the layout). The image file may be processed by a layout detector, as discussed above, which can auto-annotate the image file with bounding boxes, component class labels or annotations, spatial locations, etc. for use by the layout management system to generate a layout representation.

As discussed above, the layout representation, such as a graph representation, may then be mapped into a search embedding by a neural network, such as GCN 500 discussed above. The resulting search embedding can then be compared to search embeddings for the layouts in the repository to identify similar layouts. In some embodiments, layout management system may determine a distance between the query layout's search embedding and the search embeddings of the layouts in the repository in the high dimension embedding space. Various distance metrics may be used for this comparison, such as L1 distance, L2 distance, etc.

The result of the comparison is a distance metric for some or all of the layouts in the repository relative to the search embedding for the query layout. The layout management system can return all, or a portion, of the layouts corresponding to the embeddings and indicate the distance between the retrieved layouts 602 and the query layout 600. For example, a ranked list of layouts may be returned. Additionally, or alternatively, only layouts with a distance metric that is within a threshold value of the query layout may be returned.

As shown in FIG. 6, the retrieved layouts are similarly structured to the query layout while looking different (e.g., different colors, shapes, etc.). For example, in the first row 604, each retrieved layout has centrally located text input boxes, text or an image at the top of the layout, and icons at the bottom of the layout. In the example of FIG. 6, the retrieved layouts are ranked from most similar (1) to least similar (5). Similarly, in the second row 606, each retrieved layout has an array of box icons and an image or text at the top of the layout.

Figure 7:
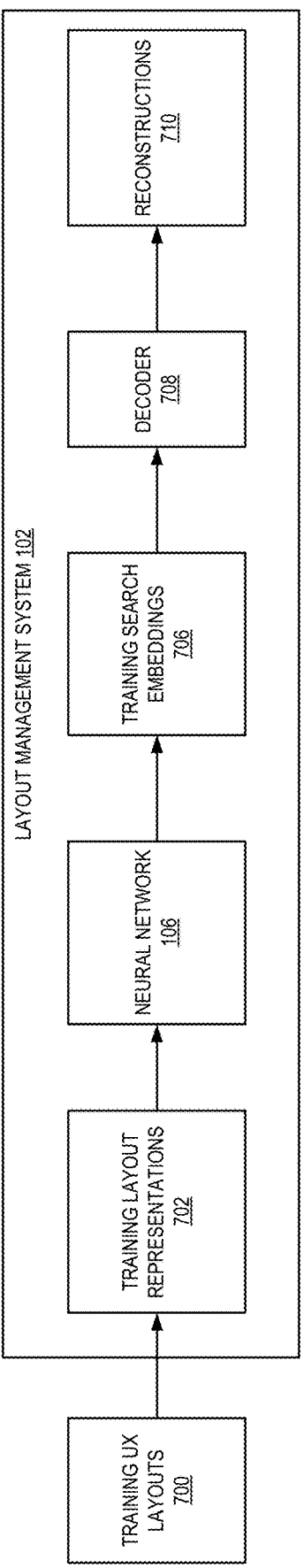
FIG. 7 illustrates an example of a process of training a neural network to generate search embeddings for user interface layouts in accordance with one or more embodiments.

FIG. 7 illustrates an example of a process of training a neural network to generate search embeddings for user interface layouts in accordance with one or more embodiments. As discussed above, embodiments use a neural network to map a layout representation into a search embedding which can then be used to identify similar layouts in the embedding space. To do this, the neural network needs to be trained to accurately map input layouts to search embeddings. As shown in FIG. 7, training may be performed using a plurality of training UX layouts 700. In some embodiments, the training layouts may be any form of digital media, such as digital images. Each training layout may be annotated or labeled with bounding boxes around the components of the UX and the class to which each component belongs. The annotations or labels may also include dimensions and spatial locations of the components. Alternatively, the dimensions and spatial locations of the components may be identified by a layout detector. In some embodiments, each training layout can be scaled to be the same size.

The training layouts may be obtained from a publicly available layout repository, such as the Rico dataset described above, a private layout repository, or a combination of sources. The training layouts may be auto-annotated, as discussed above with respect to FIG. 3, manually annotated or labeled by one or more human annotators. In some embodiments, each training layout can be converted into a raster, where each channel of the raster corresponds to a binary mask indicating whether a pixel corresponds to a particular component of the UX. For example, a first channel of the raster may include an ICON binary mask, which includes a "1" for each pixel that corresponds to an icon component, and a "0" for each pixel that does not correspond to an icon component. The raster may have as many channels as components the neural network is configured to recognize. For example, if there are 25 classes of components (such as in the Rico dataset), then the raster version of the layout may have 25 channels, each including a binary mask corresponding to a different class of component. The raster version of the layout may serve as the ground truth raster for training purposes. As such, the training UX layouts 700 make up training input for the neural network 106. For example, training input includes information provided to train a neural network. The neural network 106 utilizes the training input to learn to accurately map input UX layouts to search embeddings, as explained above.

During training, training layout representations 702, such as graph representations, may be created for the training UX layouts 700. This may proceed as discussed above with respect at least to FIGS. 1 and 4. The training layout representations 702 can be provided as input to neural network 106 which may map the training layout representations 702 to search embeddings 706. For training, a decoder 708 can be used to decode the search embeddings 706 into reconstructions 710. In some embodiments, the decoder may be a convolutional neural network (CNN), such as those used for vision-related problems (e.g., semantic segmentation, saliency detection, etc.).

The reconstruction 710 may be a raster having a number of channels equal to the number of classes of UX components the neural network is configured to recognize. The neural network can be trained end-to-end based on these reconstructions. For example, each channel of a reconstruction can be compared to each corresponding channel of the ground truth raster. The similarity of each channel can be averaged to determine an overall similarity of the reconstruction to the input training layout. The neural network may then be trained based on a reconstruction loss function, which is calculated based on the overall similarity of the reconstruction to a threshold value. Training may be performed over multiple epochs until the value of the loss function plateaus and the neural network is considered trained. Once trained, the neural network may be used to map arbitrary UX layouts into search embeddings to be used to identify similar layouts, as discussed above.

Figure 8:
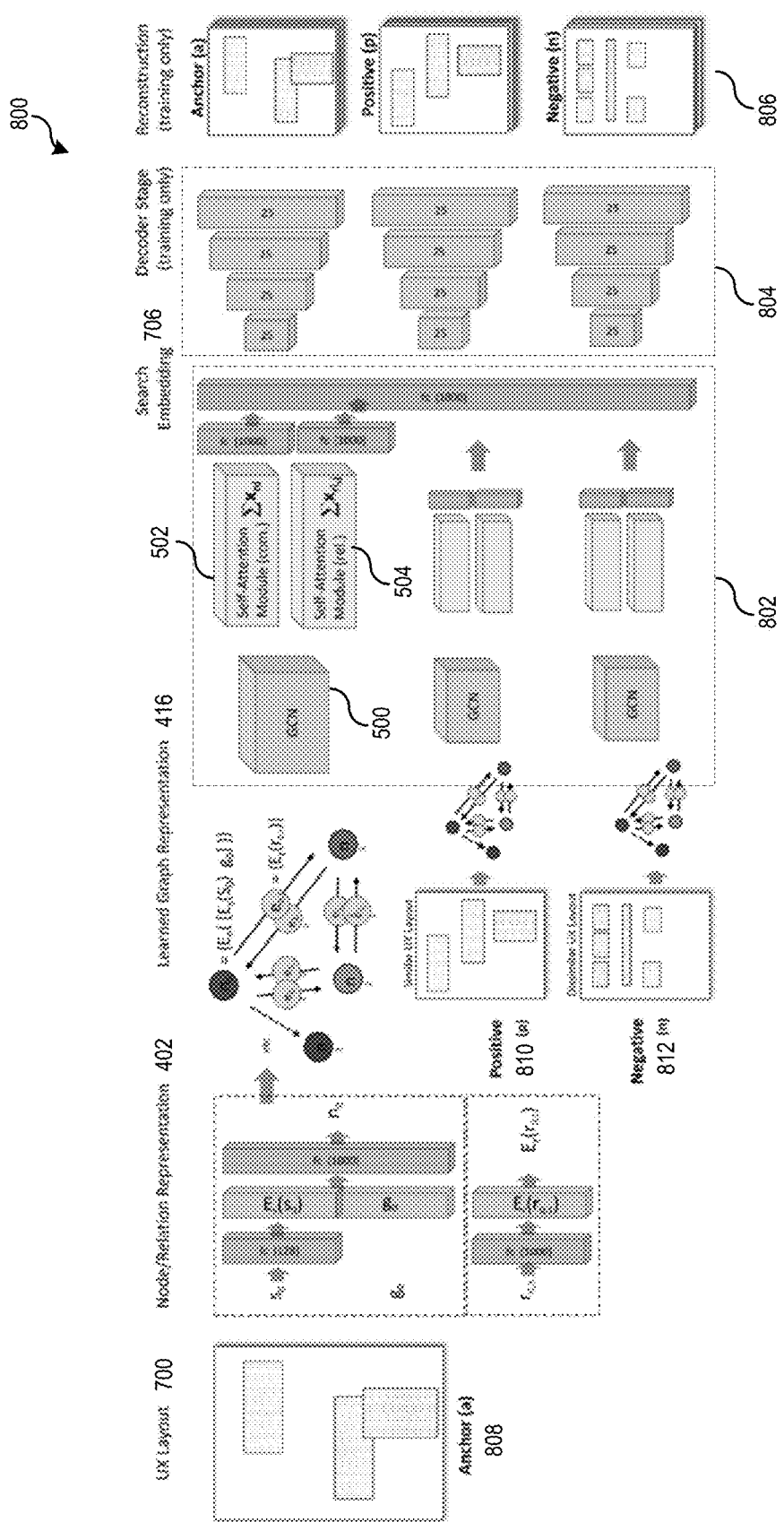
FIG. 8 illustrates an example graph convolutional network-convolutional neural network encoder-decoder architecture to learn search embeddings for user interface layouts, in accordance with one or more embodiments.

FIG. 8 illustrates an example graph convolutional network-convolutional neural network encoder-decoder architecture 800 to learn search embeddings for user interface layouts, in accordance with one or more embodiments. As shown in FIG. 8, in some embodiments, for training the neural network may be implemented using a GCN-CNN architecture. The architecture may be a triplet architecture which comprises a GCN encoder 802 which encodes a training UX layout 700 into a search embedding 706, and a transposed CNN decoder 804 that reconstructs a multi-channel raster rendering 806 of the layout. As discussed, the decoder and reconstruction stages may be used during training to train the GCN encoder 802. Once trained, the GCN encoder may be used to map an arbitrary input UX layout to a search embedding for use in identifying similar layouts.

In a triplet architecture, triplets of layouts are presented to learn the latent representation of the layout which forms the search embedding. The triplet of layouts may include an anchor layout 808, a positive layout 810 which is similar to the anchor layout, and a negative layout 812 which is dissimilar to the anchor layout. The anchor, positive, and negative layouts may each be processed by the GCN-CNN network, and the network may be trained to reduce the dissimilarity between the anchor and positive layouts and increase the dissimilarity of the anchor and the negative layouts. In some embodiments, training may be performed using a dual loss function $L_{total} = \Sigma_{x \in \{a,p,n\}} L_{rec}(x,x') + \lambda L_{tri}(a,p,n)$, where (a,p,n) is the triplet of anchor, positive, and negative UX layouts. $L_{rec}(x,x')$ is the unsupervised reconstruction loss and $L_{tri}(a,p,n)$ is the weakly supervised triplet loss.

As discussed above, the GCN can encode a layout into a search embedding 706 (represented herein as $f_e$). During training, each layout in a given triplet of layouts can be encoded into its corresponding search embedding. The transposed CNN decoder 804 can then decode each search embedding into an image raster. Typically, the transposed convolution (also called deconvolution) network learns increasingly localized representations while upsizing the feature maps. In some embodiments, the CNN decoder 804 may include four deconvolutional layers each comprising 25 filters with receptive field 3×3 followed by ReLU activations. Although 25 filters are depicted in FIG. 8, more or fewer filters may be used depending on the number of classes of components that were used to encode the layouts. An unpooling layer (e.g., an upsample layer) may be used before each deconvolution operation to progressively increase the spatial dimension of features. Since the upsampling operation is often prone to information loss, a strided convolution operation (e.g., with a stride of 2) may be used to upsize the feature maps without requiring upsampling/unpooling of the features.

The CNN decoder 804 can output a raster $\rho' \in \mathbb{R}^{H \times W \times N_s}$, where Ns is the number of UX component classes, H and W are height and width of the layout. In some embodiments, the H and W may be standardized (e.g., all layouts are scaled to the same size). For example, the H and W may be set to 256 and 128, respectively. The GCN-CNN network can be trained end-to-end, using mean square error (MSE) as the reconstruction loss ($L_{rec}$) between the output raster and its ground truth layout rasterized to ρ to match the dimension of the output. The reconstruction loss, using MSE, may be expressed as:

$$L_{rec}(\rho, \rho') = \sum_{m=1}^{25} \sum_{n=1}^{H} \sum_{p=1}^{W} (\rho_{mnp} - \rho'_{mnp})^2$$

While only reconstruction loss provides reasonable training of the GCN-CNN, the ability to learn metric properties in the embedding space provides a more effective search of layouts. As such, triplet training may be used to learn the metric properties in embedding space. As shown in FIG. 8, a graph representation can be generated of each layout of the triplet. Triplets may be selected using the ground-truth labels to form anchor-positive-negative in typical metric learning frameworks. However, the layouts are not labeled for similarity. Instead, average intersection over union (IoU) between component bounding boxes of two layouts can be determined and used as a weak label for selecting the triplets. For example, two layouts may be selected as anchor-positive pairs if their IoU value is greater than a positive threshold value. Based on experimental results, this threshold was set to 0.6 upon visual observations, however other threshold values may be used. Similarly, two layouts may be selected as anchor-negative pairs if the IoU value is below a negative threshold value. Based on experimental results, this value was set to 0.4, however other threshold values may be used. The triplet loss for the selected layouts (a; p; n) is given by $$L_{tri}(a,p,n) = [\|f_e^{(a)} - f_e^{(p)}\|_2 - \|f_e^{(a)} - f_e^{(n)}\|_2 + v]_+$$

where ($f_e^{(a)}$, $f_e^{(p)}$, $f_e^{(n)}$) are encoded search embeddings for the anchor (a), positive (p), and negative (n) layouts of the triplet of layouts, v=0.2 is a positive margin, and $[x]_+$=max(x,0).

The GCN-CNN network can be trained using the total loss function $L_{total}$ described above which includes both reconstruction loss and triplet loss. Experimentally, training required 50 epochs (e.g., training cycles) to converge; setting λ=0 for first half of training, and λ=$10^{-1}$ for the second using Adam optimizer with initial learning rate of $10^{-3}$. Adam is an adaptive learning rate optimization algorithm developed for training deep neural networks. Alternative training algorithms may also be used to train the GCN-CNN network. The resulting embeddings generated by the trained GCN encoder may then be compared a distance metric, such as L1-distance or L2-distance, to search for similar layouts.

Figure 9:
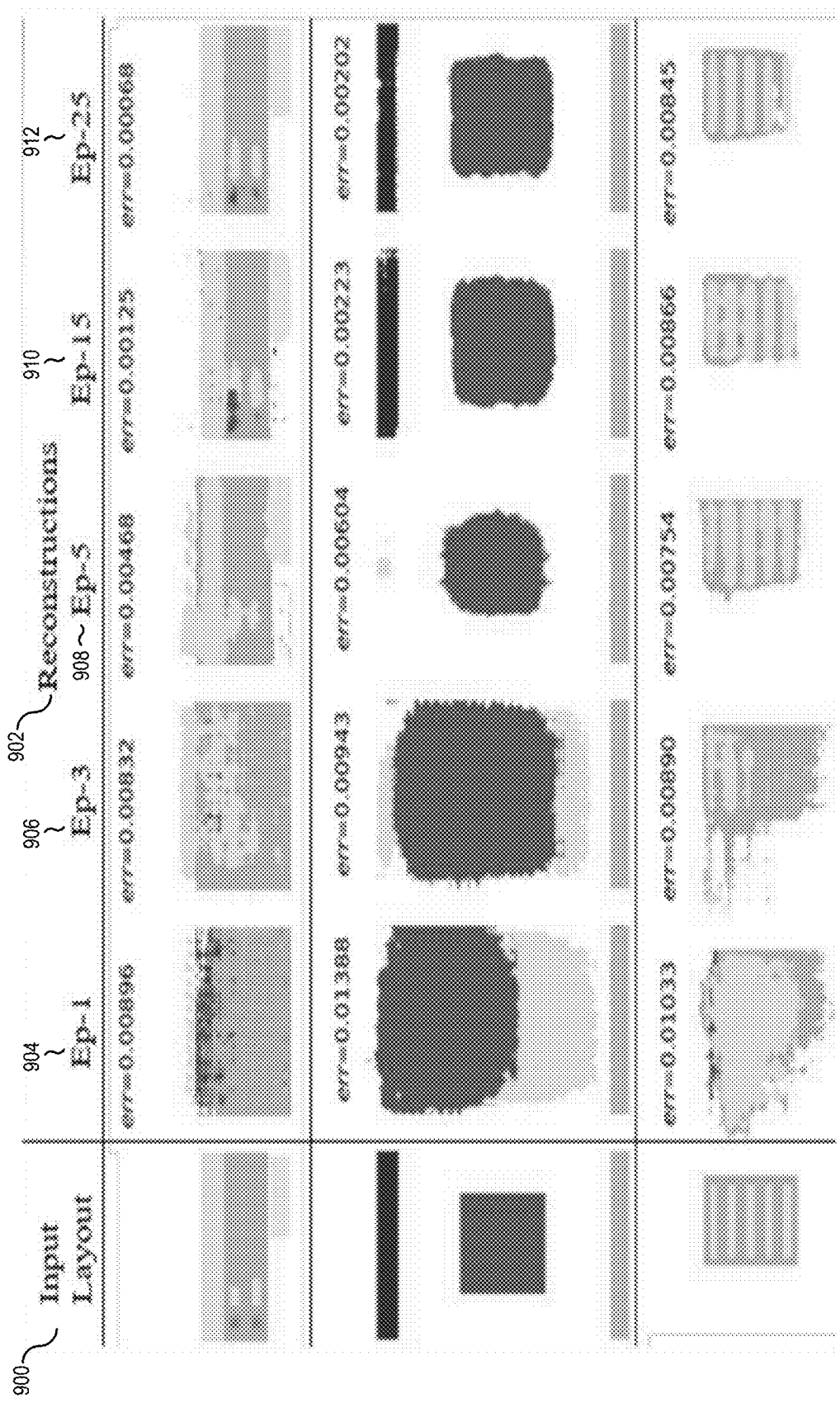
FIG. 9 illustrates a diagram of raster reconstructions of layout search embeddings, in accordance with one or more embodiments.

FIG. 9 illustrates a diagram of raster reconstructions of layout search embeddings, in accordance with one or more embodiments. As discussed, during training the CNN decoder can reconstruction of the layout that was encoded into a search embedding as a multi-channel raster representation. Each channel of the raster can correspond to a different class of UX component. The training may be performed by comparing the reconstruction to a ground truth raster representation of the input layout. FIG. 9 illustrates examples of the ground truth raster for an input layout (e.g., an input raster) 900 and the reconstruction rasters 902 of the corresponding layout over multiple training epochs 904-912.

The input rasters 900 and the reconstruction rasters 902 are rendered in a false color space in the examples shown in FIG. 9. Rather than red, green, blue channel (RGB) rasters, the channels of the input and reconstructed rasters each correspond to a different component class. In the example of FIG. 9, different colors are used to represent the different component classes. Each training epoch 904-912 represents a complete pass through the entire training dataset. During training, the layouts are progressively reconstructed with higher fidelity (e.g., lower error values and a closer appearance to the ground truth raster), as the GCN-CNN optimizes the total reconstruction loss described above. Once the error rates plateau, which experimentally was observed after approximately 25 epochs, then the GCN-CNN network is considered trained, and the GCN can be used to encode arbitrary input layouts and the resulting search embeddings may be used to identify similar layouts.

Figure 10:
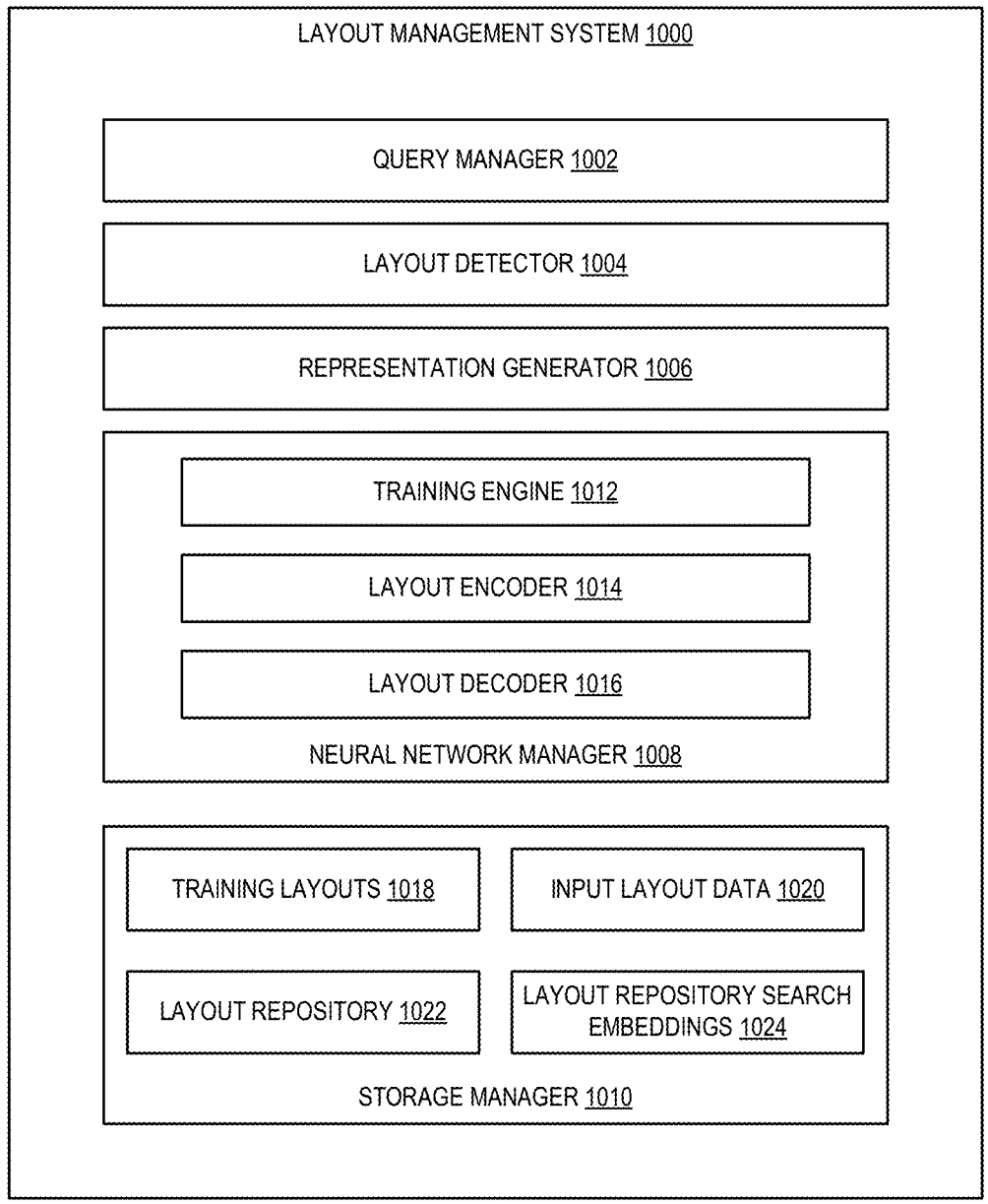
FIG. 10 illustrates a schematic diagram of layout management system in accordance with one or more embodiments.

FIG. 10 illustrates a schematic diagram of layout management system (e.g., "layout management system" described above) in accordance with one or more embodiments. As shown, the layout management system 1000 may include, but is not limited to, a query manager 1002, a layout detector 1004, a representation generator 1006, a neural network manager 1008, and a storage manager 1010. The neural network manager 1008 includes a training engine 1012, a layout encoder 1014, and a layout decoder 1016. The storage manager 1010 includes training layouts 1018, input layout data 1020, layout repository 1022, and layout repository embeddings 1024.

As illustrated in FIG. 10, the layout management system 1000 includes a query manager 1002. The query manager 1002 can receive an input UX layout and coordinate other components of the layout management system 1000 to identify one or more similar layouts to the input UX layout from one or more layout repositories. For example, as discussed, an input UX layout can include a digital image of a UX layout. If the digital image is not annotated with the UX components and their classes, the query manager 1002 can use layout detector 1004 to auto-annotate the input UX layout. The layout detector 1004 may include a neural network, such as a R-CNN, that has been trained to identify UX components and their classes. The layout detector 1004 can output bounding boxes and class annotations for each component in the input UX layout.

As further illustrated in FIG. 10, the layout management system 1000 may further include a representation generator 1006. The representation generator 1006 may receive the annotated input UX layout and generate a representation of the layout which can be processed by the layout encoder 1014. For example, the layout representation may be a graph representation. As discussed, the graph representation may include nodes corresponding to each component of the annotated UX and may comprise both semantic features (e.g., the component class) and geometric features (e.g., component dimensions, centroid, spatial location, etc.). The edges of the graph may include relationship features between a given pair of nodes (e.g., relative orientation, relative location, relative size, etc.). In some embodiments, the layout representation may be learned. For example, the representation generator may include one or more neural network layers that generate semantic, geometric, and relationship embeddings which are included in the nodes of the resulting graph representation.

The layout representation generated by representation generator 1006 can be processed by layout encoder 1014. As discussed, layout encoder 1014 can map the layout representation to a search embedding. The search embedding can be compared to layout repository search embeddings 1024 to identify similar layouts to the input UX layout. For example, a distance metric may be used to identify other layout search embeddings that are "close" to the input UX layout search embedding in embedding space. One or more of the similar layouts the correspond to the close search embeddings can be identified in layout repository 1022 and may be returned to the user. For example, the digital image representations of the similar layouts may be displayed to the user on a computing device within a UX design tool. Additionally, or alternatively, a design recommendation may be returned to the user based on the similar layouts. For example, a recommendation may be made to relocate, add, remove, or otherwise change one or more components within the input UX layout to increase the similarity to one or more of the similar layouts from the layout repository.

As further illustrated in FIG. 10, the layout management system 1000 includes the neural network manager 1008 that manages the training engine 1012. The training engine 1012 can teach, guide, tune, and/or train one or more neural networks. In particular, the training engine 1012 can train a neural network based on a plurality of training data (e.g., training layouts 1018). As discussed, the training layouts may include digital images of UX layouts, layouts obtained from a UX design tool, or other UX layout data. More specifically, the training engine 1012 can access, identify, generate, create, and/or determine training input and utilize the training input to train and fine-tune a neural network. For instance, the training engine 1012 can train the layout encoder and layout decode, as discussed above in detail with respect to FIGS. 7-9.

In addition, and as mentioned directly above, the neural network manager 1008 can manage the training and the use of various neural networks. In particular, the neural network manager 1008 manages the training and utilization of the layout encoder 1014 and the layout decoder network 1016. The layout encoder 1014 and layout decoder 1016 can include one or all of the features and functions described above with respect to the neural network 106, GCN 500, decoder 708, and GCN-CNN encoder-decoder architecture 800 of FIGS. 1, 5, 7, and 8. Moreover, in one or more embodiments the search embeddings can be generated using other types of networks.

As illustrated in FIG. 10, the layout management system 1000 also includes the storage manager 1010. The storage manager 1010 maintains data for the layout management system 1000. The storage manager 1010 can maintain data of any type, size, or kind as necessary to perform the functions of the layout management system 1000. The storage manager 1010, as shown in FIG. 10, includes the training layouts 1018. The training layouts 1018 can include a plurality of digital training images associated with various UX layouts, as discussed in additional detail above. In particular, in one or more embodiments, the training layouts 1018 include digital training images utilized by the neural network training engine 1012 to train one or more neural networks to generate search embeddings of the layouts.

As further illustrated in FIG. 10, the storage manager 1010 also includes input layout data 1020. Input layout data 1020 can include information for any digital image utilized by the layout management system 1000. For example, input layout data 1020 includes a digital image of a UX layout provided by a user, where the user seeks to identify UX layouts that are similar to it. The storage manager 1010 may also include layout repository data 1022. The layout repository data 1022 may include a plurality of UX layouts, including digital image representations of the UX layouts, editable versions of UX layouts etc. The layout repository data 1022 may include public UX layout repositories, such as the Rico dataset, and/or private layout repositories maintained by a design firm, private company, or other entity. The storage manager 1010 may further include layout repository search embeddings 1024. The layout repository search embeddings 1024 may correspond to the UX layouts in the layout repository 1022 and may have been generated using layout encoder 1014. The layout repository search embeddings may be compared to an input UX layout (e.g., from input layout data 1020) to identify layouts that are similar to the input UX layout, as discussed above.

Embodiments described above outperform existing raster-based methods for identifying UX design similarity. For example, embodiments have been compared to a multilayer perceptron (MLP)-based autoencoder (AE) and a convolutional autoencoder (CAE) which is based on a convolutional neural network, as shown in Table 1, below.

TABLE 1

Experimental Performance Comparison

| | Method | | | | | | | | |
|---|---|---|---|---|---|---|---|---|---|
| | MIoU (%) | | | MPixAcc (%) | | | AMT P@k (%) | | |
| k | 1 | 5 | 10 | 1 | 5 | 10 | 1 | 5 | 10 |
| AE | 43.0 | 34.7 | 28.9 | 46.9 | 40.6 | 35.1 | 18.0 | 6.0 | 8.0 |
| CAE | 59.5 | 47.1 | 43.9 | 66.6 | 54.3 | 50.8 | 42.0 | 12.0 | 12.0 |
| GCN-CNN (Ours) | 60.0 | 51.6 | 48.3 | 68.3 | 58.9 | 56.5 | 42.0 | 26.0 | 18.0 |
| GCN-CNN-TRI (Ours) | 61.7 | 54.1 | 51.3 | 70.1 | 64.0 | 61.0 | 46.0 | 30.0 | 36.0 |

The MLP-based AE was used to reconstruct images obtained by rasterizing semantic user interfaces, and the CNN-based CAE was used to learn layout embeddings. Table 1 shows layout retrieval performances in terms of mean intersection over union (MIoU), mean pixel accuracy (MPixAcc) and precision @ k (P@k). The GCN-CNN embodiment achieves a top-10 MIoU of 48.3% and MPixAcc of 56.5%, which is further boosted by triplet training (GCN-CNN-TRI) to 51.3% and 61.0% respectively. As such, experimenters found that embodiments significantly outperform existing methods by +22.4% and +7.4% in terms of top-10 MIoU. Embodiments similarly outperformed the AE and CAE techniques in MPixAcc and P@k, as shown above. Based on the experimental evidence, the fine-grain structural information encoded by the GCN (e.g., semantic, geometric, and relationship features described above) enables more robust matching. Overall, the results clearly demonstrate the benefits of the Graph-based architecture described herein for training a layout embedding (GCN-CNN), and the advantage of metric learning in GCN-CNN-TRI.

In some embodiments, the representation of the layout may be used by as a prior by the layout detector to improve the recognition performance of off the shelf detectors that detect components in layouts. This may be used similarly to techniques of optical character recognition where characters are not recognized in isolation but instead a prior or bias is used based on the structure of language to improve character recognition performance. The learned representation of the layout may be used similarly to improve component identification by layout detectors.

Each of the components 1004-1010 of the layout management system 1000 and their corresponding elements (as shown in FIG. 10) may be in communication with one another using any suitable communication technologies. It will be recognized that although components 1004-1010 and their corresponding elements are shown to be separate in FIG. 10, any of components 1004-1010 and their corresponding elements may be combined into fewer components, such as into a single facility or module, divided into more components, or configured into different components as may serve a particular embodiment.

The components 1004-1010 and their corresponding elements can comprise software, hardware, or both. For example, the components 1004-1010 and their corresponding elements can comprise one or more instructions stored on a computer-readable storage medium and executable by processors of one or more computing devices. When executed by the one or more processors, the computer-executable instructions of the layout management system 1000 can cause a client device and/or a server device to perform the methods described herein. Alternatively, the components 1004-1010 and their corresponding elements can comprise hardware, such as a special purpose processing device to perform a certain function or group of functions. Additionally, the components 1004-1010 and their corresponding elements can comprise a combination of computer-executable instructions and hardware.

Furthermore, the components 1004-1010 of the layout management system 1000 may, for example, be implemented as one or more stand-alone applications, as one or more modules of an application, as one or more plug-ins, as one or more library functions or functions that may be called by other applications, and/or as a cloud-computing model. Thus, the components 1004-1010 of the layout management system 1000 may be implemented as a stand-alone application, such as a desktop or mobile application. Furthermore, the components 1004-1010 of the layout management system 1000 may be implemented as one or more web-based applications hosted on a remote server. Alternatively, or additionally, the components of the layout management system 1000 may be implemented in a suit of mobile device applications or "apps." To illustrate, the components of the layout management system 1000 may be implemented in a UX design application, including but not limited to ADOBE® XD. "ADOBE®" is either a registered trademark or trademark of Adobe Inc. in the United States and/or other countries.

Figure 11:
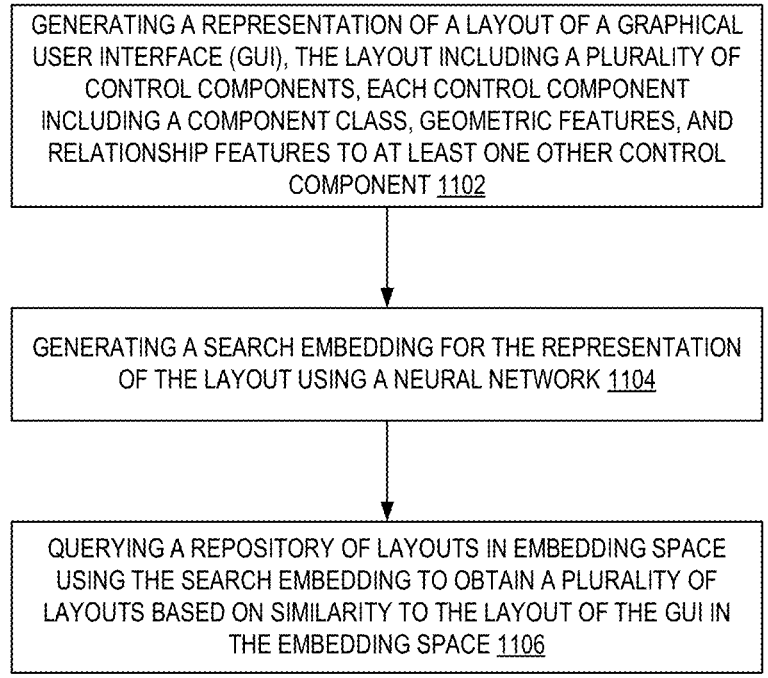
FIG. 11 illustrates a flowchart of a series of acts in a method of identifying similar graphical user interface layouts in accordance with one or more embodiments.
Figure 12:
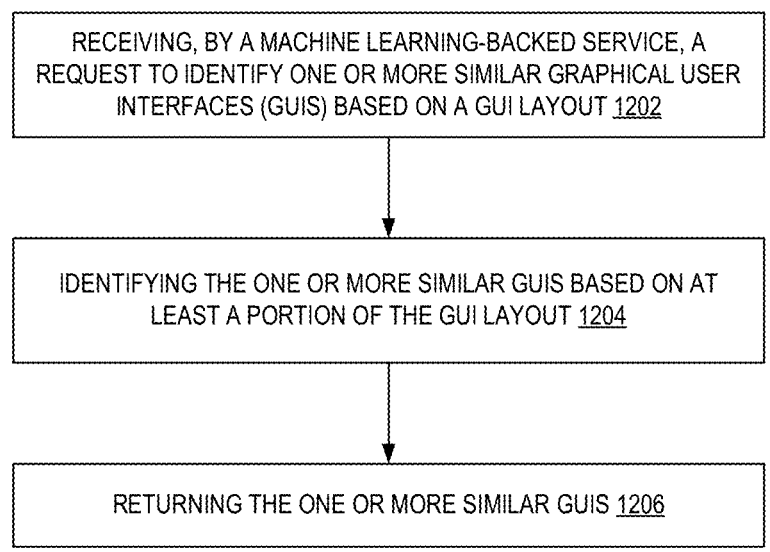
FIG. 12 illustrates a flowchart of a series of acts in another method of identifying similar graphical user interface layouts in accordance with one or more embodiments.

FIGS. 1-10, the corresponding text, and the examples, provide a number of different systems and devices that use machine learning techniques to encode user experience layouts into search embeddings and use the search embeddings to identify layouts that are structurally similar to one another. In addition to the foregoing, embodiments can also be described in terms of flowcharts comprising acts and steps in a method for accomplishing a particular result. For example, FIGS. 11 and 12 illustrate flowcharts of exemplary methods in accordance with one or more embodiments. The methods described in relation to FIGS. 11 and 12 may be performed with less or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart 1100 of a series of acts in a method of identifying similar graphical user interface layouts in accordance with one or more embodiments. In one or more embodiments, the method 1100 is performed in a digital medium environment that includes the layout management system 1000. The method 1100 is intended to be illustrative of one or more methods in accordance with the present disclosure and is not intended to limit potential embodiments. Alternative embodiments can include additional, fewer, or different steps than those articulated in FIG. 11.

As illustrated in FIG. 11, the method 1100 includes an act 1102 of generating a representation of a layout of a graphical user interface (GUI), the layout including a plurality of control components, each control component including a component class, geometric features, and relationship features to at least one other control component. In some embodiments, generating a representation of the layout of the GUI may further include generating a graph representation of the layout, the graph representation including a plurality of nodes corresponding to the plurality of control components and at least one edge connecting the plurality of nodes. Each node includes a semantic feature corresponding to a component class, and a geometric feature corresponding to dimensions of a corresponding control component. The at least one edge includes relationship features including at least one of a relative distance, orientation, aspect ratio, or component nesting between a pair of control components.

As discussed, the layout of the GUI may be received during the design process as an incomplete layout or as a finished layout. For example, in some embodiments, the method may include obtaining the layout of the GUI from a user experience (UX) design tool. The method may further include processing the layout of the GUI by a layout detector. The layout of the GUI is a digital image of the layout of the GUI, the layout detector to auto-annotate the layout of the GUI with a plurality of bounding boxes and one or more component classes corresponding to the plurality of control components in the layout.

As shown in FIG. 11, the method 1100 also includes an act 1104 of generating a search embedding for the representation of the layout using a neural network. In some embodiments, generating the search embedding may further include processing the plurality of nodes of the graph representation by a first one or more layers of a graph convolutional network (GCN) to generate a plurality of node embeddings, and processing the at least one edge of the graph representation by a second one or more layers of the GCN to generate a plurality of relationship embeddings. In some embodiments, the neural network may be trained using one or more training data repositories that include labeled UX layouts. For example, the method may include training the neural network using a training layout repository, the training layout repository including a plurality of labeled GUI layouts, wherein during training the neural network comprises a graph convolutional network (GCN)-convolutional neural network (CNN) triplet architecture.

In some embodiments, the method may further include the acts of determining a weighted average of the plurality of node embeddings using a first self-attention module, determining a weighted average of the plurality of relationship embeddings using a second self-attention module, and generating the search embedding based on the weighted average of the plurality of node embeddings and the weighted average of the plurality of relationship embeddings.

As illustrated in FIG. 11, the method 1100 also includes an act 1106 of querying a repository of layouts in embedding space using the search embedding to obtain a plurality of layouts based on similarity to the layout of the GUI in the embedding space. In some embodiments, querying the repository of layouts in embedding space may further include determining a distance between the search embedding and each layout in the repository of layouts in the embedding space using a distance metric, and returning the plurality of layouts based at least on the distance between the search embedding and the plurality of layouts. In some embodiments, returning the plurality of layouts may further include returning a layout recommendation based at least on the plurality of layouts, wherein the layout recommendation includes at least one of a control component or a control component geometry to be changed in the layout of the GUI.

FIG. 12 illustrates a flowchart 1200 of a series of acts in another method of identifying similar graphical user interface layouts in accordance with one or more embodiments. In one or more embodiments, the method 1200 is performed in a digital medium environment that includes the layout management system 1000. The method 1200 is intended to be illustrative of one or more methods in accordance with the present disclosure and is not intended to limit potential embodiments. Alternative embodiments can include additional, fewer, or different steps than those articulated in FIG. 12.

As illustrated in FIG. 12, the method 1200 includes an act 1202 of receiving, by a machine-learning backed service, a request to identify one or more similar graphical user interfaces (GUIs) based on a GUI layout. In some embodiments, the machine-learning backed service may be a web service, or other application, configured to receive requests over one or more networks (e.g., the Internet). For example, a machine-learning backed service may be a web service or other application that uses machine learning techniques to perform one or more requested actions. In some embodiments, the request may be received from an application executing on a client computing device, such as a UX design tool, web browser, or other application.

As shown in FIG. 12, the method 1200 also includes an act 1204 of identifying the one or more similar GUIs based on the at least a portion of the GUI layout. The machine learning-backed service may use one or more machine learning techniques to identify the one or more similar GUIs. For example, identifying the one or more similar GUIs may include generating a representation of the GUI layout, the GUI layout including a plurality of control components, each control component including a component class, geometric features, and relationship features to at least one other control component, generating a search embedding for the representation of the GUI layout using a neural network, and querying a repository of layouts in embedding space using the search embedding to obtain a plurality of layouts based on similarity to the GUI layout in the embedding space.

In some embodiments, the method may further include an act of generating a graph representation of the GUI layout, the graph representation including a plurality of nodes corresponding to the plurality of control components and at least one edge connecting the plurality of nodes. Each node includes a semantic feature corresponding to a component class, and a geometric feature corresponding to dimensions of a corresponding control component. The at least one edge includes relationship features including at least one of a relative distance, orientation, aspect ratio, or component nesting between a pair of control components.

In some embodiments, generating the search embedding may further include processing the plurality of nodes of the graph representation by a first one or more layers of a graph convolutional network (GCN) to generate a plurality of node embeddings, and processing the at least one edge of the graph representation by a second one or more layers of the GCN to generate a plurality of relationship embeddings. Additionally, generating the search embedding may further include determining a weighted average of the plurality of node embeddings using a first self-attention module, determining a weighted average of the plurality of relationship embeddings using a second self-attention module, and generating the search embedding based on the weighted average of the plurality of node embeddings and the weighted average of the plurality of relationship embeddings As illustrated in FIG. 12, the method 1200 also includes an act 1206 of returning the one or more similar GUIs. In some embodiments, the one or more similar GUIs may be sent to the client computing device which originated the request, to be displayed on the client computing device or other computing device. In some embodiments, the one or more similar GUIs may be returned as recommendations of changes to be made to one or more components of the GUI layout (e.g., size, location, component class, etc.).

Figure 13:
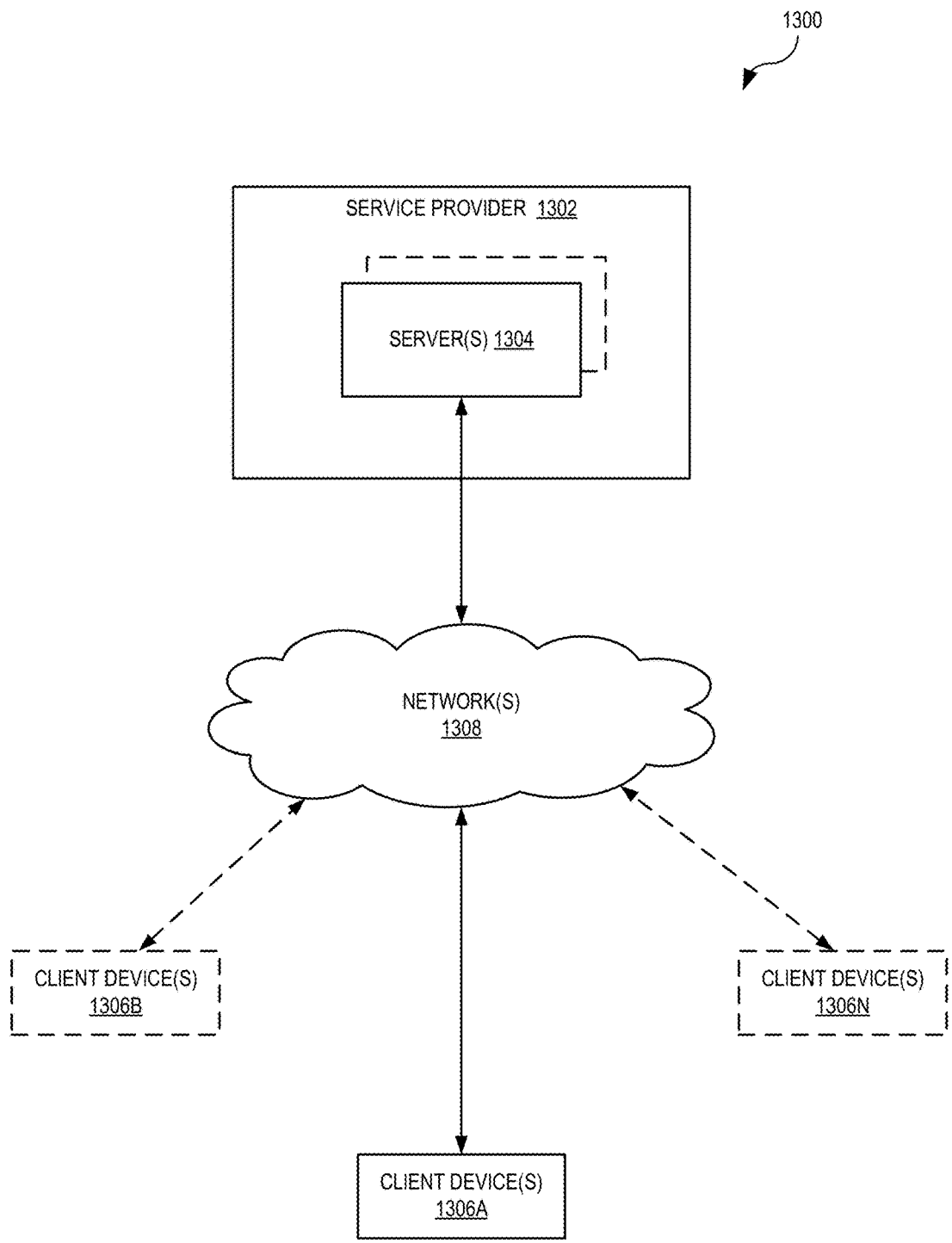
FIG. 13 illustrates a schematic diagram of an exemplary environment in which the image processing system can operate in accordance with one or more embodiments.

FIG. 13 illustrates a schematic diagram of an exemplary environment 1300 in which the layout management system 1000 can operate in accordance with one or more embodiments. In one or more embodiments, the environment 1300 includes a service provider 1302 which may include one or more servers 1304 connected to a plurality of client devices 1306A-1306N via one or more networks 1308. The client devices 1306A-1306N, the one or more networks 1308, the service provider 1302, and the one or more servers 1304 may communicate with each other or other components using any communication platforms and technologies suitable for transporting data and/or communication signals, including any known communication technologies, devices, media, and protocols supportive of remote data communications, examples of which will be described in more detail below with respect to FIG. 14.

Although FIG. 13 illustrates a particular arrangement of the client devices 1306A-1306N, the one or more networks 1308, the service provider 1302, and the one or more servers 1304, various additional arrangements are possible. For example, the client devices 1306A-1306N may directly communicate with the one or more servers 1304, bypassing the network 1308. Or alternatively, the client devices 1306A-1306N may directly communicate with each other. The service provider 1302 may be a public cloud service provider which owns and operates their own infrastructure in one or more data centers and provides this infrastructure to customers and end users on demand to host applications on the one or more servers 1304. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1304. In some embodiments, the service provider may be a private cloud provider which maintains cloud infrastructure for a single organization. The one or more servers 1304 may similarly include one or more hardware servers, each with its own computing resources, which are divided among applications hosted by the one or more servers for use by members of the organization or their customers.

Similarly, although the environment 1300 of FIG. 13 is depicted as having various components, the environment 1300 may have additional or alternative components. For example, the environment 1300 can be implemented on a single computing device with the layout management system 1000. In particular, the layout management system 1000 may be implemented in whole or in part on the client device 1302A.

As illustrated in FIG. 13, the environment 1300 may include client devices 1306A-1306N. The client devices 1306A-1306N may comprise any computing device. For example, client devices 1306A-1306N may comprise one or more personal computers, laptop computers, mobile devices, mobile phones, tablets, special purpose computers, TVs, or other computing devices, including computing devices described below with regard to FIG. 14. Although three client devices are shown in FIG. 13, it will be appreciated that client devices 1306A-1306N may comprise any number of client devices (greater or smaller than shown).

Moreover, as illustrated in FIG. 13, the client devices 1306A-1306N and the one or more servers 1304 may communicate via one or more networks 1308. The one or more networks 1308 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1308 may be any suitable network over which the client devices 1306A-1306N may access service provider 1302 and server 1304, or vice versa. The one or more networks 1308 will be discussed in more detail below with regard to FIG. 14.

In addition, the environment 1300 may also include one or more servers 1304. The one or more servers 1304 may generate, store, receive, and transmit any type of data, including training layout data 1018, input layout data 1020, layout repository data 1022, layout repository search embeddings 1024, or other information. For example, a server 1304 may receive data from a client device, such as the client device 1306A, and send the data to another client device, such as the client device 1302B and/or 1302N. The server 1304 can also transmit electronic messages between one or more users of the environment 1300. In one example embodiment, the server 1304 is a data server. The server 1304 can also comprise a communication server or a web-hosting server. Additional details regarding the server 1304 will be discussed below with respect to FIG. 14.

As mentioned, in one or more embodiments, the one or more servers 1304 can include or implement at least a portion of the layout management system 1000. In particular, the layout management system 1000 can comprise an application running on the one or more servers 1304 or a portion of the layout management system 1000 can be downloaded from the one or more servers 1304. For example, the layout management system 1000 can include a web hosting application that allows the client devices 1306A-1306N to interact with content hosted at the one or more servers 1304. To illustrate, in one or more embodiments of the environment 1300, one or more client devices 1306A-1306N can access a webpage supported by the one or more servers 1304. In particular, the client device 1306A can run a web application (e.g., a web browser) to allow a user to access, view, and/or interact with a webpage or website hosted at the one or more servers 1304.

Upon the client device 1306A accessing a webpage or other web application hosted at the one or more servers 1304, in one or more embodiments, the one or more servers 1304 can provide access to one or more digital images (e.g., the input image data 1012, such as camera roll or an individual's personal photos) stored at the one or more servers 1304. Moreover, the client device 1306A can receive a request (i.e., via user input) to search for similar layouts to an input UX layout and provide the request to the one or more servers 1304. Upon receiving the request, the one or more servers 1304 can automatically perform the methods and processes described above to identify similar layouts. The one or more servers 1304 can provide all or portions of one or more similar layouts, or recommendations based on the one or more similar layouts, to the client device 1306A for display to the user.

As just described, the layout management system 1000 may be implemented in whole, or in part, by the individual elements 1302-1308 of the environment 1300. It will be appreciated that although certain components of the layout management system 1000 are described in the previous examples with regard to particular elements of the environment 1300, various alternative implementations are possible. For instance, in one or more embodiments, the layout management system 1000 is implemented on any of the client devices 1306A-N. Similarly, in one or more embodiments, the layout management system 1000 may be implemented on the one or more servers 1304. Moreover, different components and functions of the layout management system 1000 may be implemented separately among client devices 1306A-1306N, the one or more servers 1304, and the network 1308.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
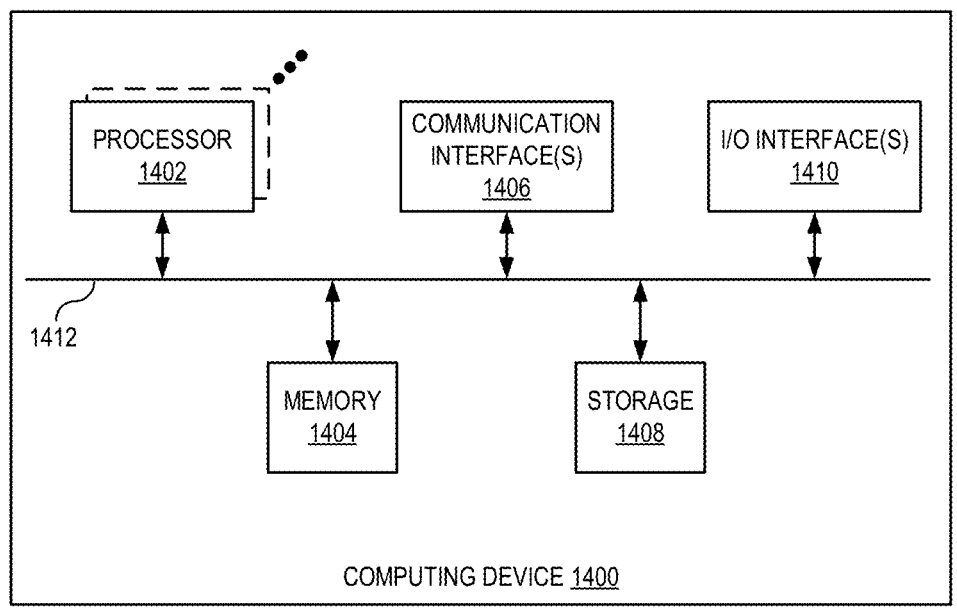
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that one or more computing devices such as the computing device 1400 may implement the image processing system. As shown by FIG. 14, the computing device can comprise a processor 1402, memory 1404, one or more communication interfaces 1406, a storage device 1408, and one or more I/O devices/interfaces 1410. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1408 and decode and execute them. In various embodiments, the processor(s) 1402 may include one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 can further include one or more communication interfaces 1406. A communication interface 1406 can include hardware, software, or both. The communication interface 1406 can provide one or more interfaces for communication (such as, for example, packet-based communication) between the computing device and one or more other computing devices 1400 or one or more networks. As an example and not by way of limitation, communication interface 1406 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

The computing device 1400 includes a storage device 1408 includes storage for storing data or instructions. As an example, and not by way of limitation, storage device 1408 can comprise a non-transitory storage medium described above. The storage device 1408 may include a hard disk drive (HDD), flash memory, a Universal Serial Bus (USB) drive or a combination these or other storage devices. The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 may include a mouse, keypad or a keyboard, a touch screen, camera, optical scanner, network interface, modem, other known I/O devices or a combination of such I/O devices/interfaces 1410. The touch screen may be activated with a stylus or a finger.

The I/O devices/interfaces 1410 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

I claim:

1. A computer-implemented method comprising:
generating a graph representation of a layout of a graphical user interface (GUI), the layout including a plurality of control components, each control component including a component class, geometric features, and relationship features to at least one other control component, the graph representation including a plurality of nodes corresponding to the plurality of control components and at least one edge connecting the plurality of nodes;
processing the plurality of nodes of the graph representation by a first one or more layers of a graph convolutional network (GCN) to generate a plurality of node embeddings;
processing the at least one edge of the graph representation by a second one or more layers of the GCN to generate a plurality of relationship embeddings;
generating a search embedding for the representation of the layout based on the plurality of node embeddings and the plurality of relationship embeddings; and
querying a repository of layouts in embedding space using the search embedding to obtain a plurality of layouts based on similarity to the layout of the GUI in the embedding space.

2. The computer-implemented method of claim 1 wherein each node includes a semantic feature corresponding to a component class, and a geometric feature corresponding to dimensions of a corresponding control component, and
wherein the at least one edge includes relationship features including at least one of a relative distance, orientation, aspect ratio, or component nesting between a pair of control components.

3. The computer-implemented method of claim 2, further comprising:
determining a weighted average of the plurality of node embeddings using a first self-attention module;
determining a weighted average of the plurality of relationship embeddings using a second self-attention module; and
generating the search embedding based on the weighted average of the plurality of node embeddings and the weighted average of the plurality of relationship embeddings.

4. The computer-implemented method of claim 1, further comprising:
obtaining the layout of the GUI from a user experience (UX) design tool.

5. The computer-implemented method of claim 4, further comprising:
processing the layout of the GUI by a layout detector, wherein the layout of the GUI is a digital image of the layout of the GUI, the layout detector to auto-annotate the layout of the GUI with a plurality of bounding boxes and one or more component classes corresponding to the plurality of control components in the layout.

6. The computer-implemented method of claim 1, wherein querying a repository of layouts in embedding space using the search embedding to obtain a plurality of layouts based on similarity to the layout of the GUI in the embedding space, further comprises:
determining a distance between the search embedding and each layout in the repository of layouts in the embedding space using a distance metric; and
returning the plurality of layouts based at least on the distance between the search embedding and the plurality of layouts.

7. The computer-implemented method of claim 6, wherein returning the plurality of layouts based at least on the distance between the search embedding and the plurality of layouts, further comprises:
  returning a layout recommendation based at least on the plurality of layouts, wherein the layout recommendation includes at least one of a control component or a control component geometry to be changed in the layout of the GUI.

8. The computer-implemented method of claim 1, further comprising:
  training the neural network using a training layout repository, the training layout repository including a plurality of labeled GUI layouts, wherein during training the neural network comprises a graph convolutional network (GCN)-convolutional neural network (CNN) triplet architecture.

9. A non-transitory computer-readable storage medium including instructions stored thereon which, when executed by at least one processor, cause the at least one processor to:
  generate a graph representation of a layout of a graphical user interface (GUI), the layout including a plurality of control components, each control component including a component class, geometric features, and relationship features to at least one other control component, the graph representation including a plurality of nodes corresponding to the plurality of control components and at least one edge connecting the plurality of nodes;
  process the plurality of nodes of the graph representation by a first one or more layers of a graph convolutional network (GCN) to generate a plurality of node embeddings;
  process the at least one edge of the graph representation by a second one or more layers of the GCN to generate a plurality of relationship embeddings;
  generate a search embedding for the representation of the layout based on the plurality of node embeddings and the plurality of relationship embeddings; and
  query a repository of layouts in embedding space using the search embedding to obtain a plurality of layouts based on similarity to the layout of the GUI in the embedding space.

10. The non-transitory computer-readable storage medium of claim 9,
  wherein each node includes a semantic feature corresponding to a component class, and a geometric feature corresponding to dimensions of a corresponding control component, and
  wherein the at least one edge includes relationship features including at least one of a relative distance, orientation, aspect ratio, or component nesting between a pair of control components.

11. The non-transitory computer-readable storage medium of claim 10, wherein the instructions, when executed, further cause the at least one processor to:
  determine a weighted average of the plurality of node embeddings using a first self-attention module;
  determine a weighted average of the plurality of relationship embeddings using a second self-attention module; and
  generate the search embedding based on the weighted average of the plurality of node embeddings and the weighted average of the plurality of relationship embeddings.

12. The non-transitory computer-readable storage medium of claim 9, wherein the instructions to query a repository of layouts in embedding space using the search embedding to obtain a plurality of layouts based on similarity to the layout of the GUI in the embedding space, when executed, further cause the at least one processor to:
  determine a distance between the search embedding and each layout in the repository of layouts in the embedding space using a distance metric; and
  return the plurality of layouts based at least on the distance between the search embedding and the plurality of layouts.

13. The non-transitory computer-readable storage medium of claim 12, wherein the instructions to return the plurality of layouts based at least on the distance between the search embedding and the plurality of layouts, when executed, further cause the at least one processor to:
  return a layout recommendation based at least on the plurality of layouts, wherein the layout recommendation includes at least one of a control component or a control component geometry to be changed in the layout of the GUI.

14. A computer-implemented method comprising:
  receiving, by a machine learning-backed service, a request to identify one or more similar graphical user interfaces (GUIs) based on a GUI layout;
  generating a graph representation of a layout of a graphical user interface (GUI), the layout including a plurality of control components, each control component including a component class, geometric features, and relationship features to at least one other control component, the graph representation including a plurality of nodes corresponding to the plurality of control components and at least one edge connecting the plurality of nodes;
  processing the plurality of nodes of the graph representation by a first one or more layers of a graph convolutional network (GCN) to generate a plurality of node embeddings;
  processing the at least one edge of the graph representation by a second one or more layers of the GCN to generate a plurality of relationship embeddings;
  generating a search embedding for the representation of the layout based on the plurality of node embeddings and the plurality of relationship embeddings;
  querying a repository of layouts in embedding space using the search embedding to identify the one or more similar GUIs based on similarity to the layout of the GUI in the embedding space; and
  returning the one or more similar GUIs.

15. The computer-implemented method of claim 14 wherein each node includes a semantic feature corresponding to a component class, and a geometric feature corresponding to dimensions of a corresponding control component, and
  wherein the at least one edge includes relationship features including at least one of a relative distance, orientation, aspect ratio, or component nesting between a pair of control components.

16. The computer-implemented method of claim 14, further comprising:
  determining a weighted average of the plurality of node embeddings using a first self-attention module;
  determining a weighted average of the plurality of relationship embeddings using a second self-attention module; and
  generating the search embedding based on the weighted average of the plurality of node embeddings and the weighted average of the plurality of relationship embeddings.

* * * * *